United States Patent
Perez et al.

(10) Patent No.: US 9,945,567 B2
(45) Date of Patent: Apr. 17, 2018

(54) HEATING FURNACE USING ANTI-STRATIFICATION MODE

(71) Applicant: Lennox Industries Inc., Richardson, TX (US)

(72) Inventors: Eric M. Perez, Hickory Creek, TX (US); Mark G. Beste, Grapevine, TX (US); Steven Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 261 days.

(21) Appl. No.: 15/006,662

(22) Filed: Jan. 26, 2016

(65) Prior Publication Data

US 2017/0211824 A1    Jul. 27, 2017

(51) Int. Cl.
  *F24D 19/10*   (2006.01)
  *G05B 15/02*   (2006.01)
  *F24D 5/04*    (2006.01)

(52) U.S. Cl.
  CPC .......... *F24D 19/1084* (2013.01); *F24D 5/04* (2013.01); *G05B 15/02* (2013.01); *F24D 2200/04* (2013.01); *F24D 2220/02* (2013.01); *F24D 2220/042* (2013.01); *F24D 2240/00* (2013.01)

(58) Field of Classification Search
  CPC .... F24D 19/1084; F24D 5/04; F24D 2240/00; F24D 2220/042; F24D 2200/04; F24D 2220/02; G05B 15/02
  See application file for complete search history.

(56) References Cited

U.S. PATENT DOCUMENTS

| 4,337,893 | A | * | 7/1982 | Flanders | F24D 12/02 236/1 EB |
| 4,819,587 | A | * | 4/1989 | Tsutsui | F23N 1/082 122/14.2 |
| 5,197,664 | A | * | 3/1993 | Lynch | F23N 5/242 126/116 A |
| 5,289,868 | A | * | 3/1994 | Koseki | F24F 3/06 165/219 |
| 6,000,622 | A | * | 12/1999 | Tonner | F24H 9/2085 165/247 |
| 9,500,386 | B1 | * | 11/2016 | Walsh | F24H 9/2071 |
| 9,671,125 | B2 | * | 6/2017 | Mowris | F24F 11/053 |

(Continued)

*Primary Examiner* — Ramesh Patel
(74) *Attorney, Agent, or Firm* — Baker Botts L.L.P.

(57) ABSTRACT

A heating control device comprising input/output ports, a memory, and a microprocessor. The microprocessor is configured to transmit a first electrical signal to operate an air circulation fan at a first speed and a heating unit in a first configuration to achieve a first temperature rise where less than all of the burners are active. The microprocessor is further configured to obtain a return air temperature, obtain a room air temperature, and determine a temperature difference between the return air temperature and the room air temperature. The microprocessor is further configured to compare the temperature difference to a temperature rise threshold and transmit a second electrical signal to transition the air circulation fan from the first speed to a second speed to achieve a second temperature rise that is less than the first temperature rise when the temperature difference is greater than the temperature rise threshold.

20 Claims, 14 Drawing Sheets

(56) References Cited

U.S. PATENT DOCUMENTS

| | | | |
|---|---|---|---|
| 2007/0012052 A1* | 1/2007 | Butler | F24F 11/0009 |
| | | | 62/181 |
| 2008/0124667 A1* | 5/2008 | Schultz | F23N 1/022 |
| | | | 431/18 |
| 2014/0260392 A1* | 9/2014 | Hawkins | F28D 1/06 |
| | | | 62/238.6 |
| 2017/0115025 A1* | 4/2017 | Mowris | F24F 11/053 |
| 2017/0268797 A1* | 9/2017 | Mowris | F24H 9/2071 |

* cited by examiner

HEATING FURNACE USING ANTI-STRATIFICATION MODE

TECHNICAL FIELD

This disclosure relates generally to heating, ventilating, and air conditioning (HVAC) systems, and more specifically to systems and methods for operating a heating system in multiple operation modes.

BACKGROUND

Heating, ventilation, and air conditioning (HVAC) systems can be used to regulate an environment within an enclosure. Typically, a circulating fan is used to pull air from the enclosure into the HVAC system through ducts and to push the air back into the enclosure through additional ducts after conditioning the air (e.g. heating or cooling the air). For example, a gas furnace, such as a residential gas furnace, is used in a heating system to heat the air.

Existing heating systems use two heating stages that are sized for peak periods of the year where maximum heat is required. For example, existing heating systems are typically sized to produce either 100% or 75% of their maximum heat output.

During operation, these existing systems are cycled frequently and create high discharge air temperatures that may cause heating related issues such as stratification within a room. It is desirable to provide a heating system that allows for better discharge air temperature control.

SUMMARY

In one embodiment, the disclosure includes a heating control system comprising an air circulation fan configurable to operate at a plurality of speeds and a heating unit operably coupled to the air circulation fan. The heating unit comprises a plurality of burners and is configurable to operate with less than all of the burners active. The heating control system further comprises a return air temperature sensor configured to measure a return air temperature, a room air temperature sensor configured to measure a room air temperature, and a memory operable to store a plurality of temperature rise thresholds. The heating control system further comprises a microprocessor operably coupled to the air circulation fan, the heating unit, the supply air temperature sensor, the room air temperature sensor, and the memory. The microprocessor is configured to transmit a first electrical signal to operate the air circulation fan at a first speed and the heating unit in a first configuration with at least one active burner from the plurality of burners to achieve a first temperature rise where less than all of the burners are active when the heating unit is in the first configuration. The microprocessor is further configured to obtain the return air temperature from the return air temperature sensor, obtain the room air temperature from the room air temperature sensor, and determine a temperature difference between the return air temperature and the room air temperature. The microprocessor is further configured to compare the temperature difference to a temperature rise threshold and transmit a second electrical signal to transition the air circulation fan from the first speed to a second speed to achieve a second temperature rise when the temperature difference is greater than the temperature rise threshold where the second speed is greater than the first speed and the second temperature rise is less than the first temperature rise.

In another embodiment, the disclosure includes a heating control device comprising input/output (I/O) ports configured to transmit and receive electrical signal and a memory operable to store a plurality of temperature rise thresholds. The heating control device further comprises a microprocessor operably coupled to the I/O ports and the memory. The microprocessor is configured to transmit a first electrical signal to operate an air circulation fan at a first speed and a heating unit in a first configuration with at least one active burner from a plurality of burners to achieve a first temperature rise where less than all of the burners are active when the heating unit is in the first configuration. The microprocessor is further configured to obtain a return air temperature, obtain a room air temperature, and determine a temperature difference between the return air temperature and the room air temperature. The microprocessor is further configured to compare the temperature difference to a temperature rise threshold and transmit a second electrical signal to transition the air circulation fan from the first speed to a second speed to achieve a second temperature rise when the temperature difference is greater than the temperature rise threshold where the second speed is greater than the first speed and where the second temperature rise is less than the first temperature rise.

In yet another embodiment, the disclosure includes a heating control method comprising operating an air circulation fan at a first speed and a heating unit in a first configuration with at least one active burner from a plurality of burners to achieve a first temperature rise where less than all of the burners are active when the heating unit is in the first configuration. The method further comprises obtaining a return air temperature, obtaining a room air temperature, and determining a temperature difference between the return air temperature and the room air temperature. The method further comprises comparing the temperature difference to a temperature rise threshold and transitioning the air circulation fan from the first speed to a second speed to achieve a second temperature rise when the temperature difference is greater than the temperature rise threshold where the second speed is greater than the first speed and where the second temperature rise is less than the first temperature rise.

The present embodiment presents several technical advantages. The present embodiment discloses a heating system that is reconfigurable to provide both coarse and fine temperature adjustments and control. The heating system is configured to employ a segmented gas manifold, which enables the heating system to be reconfigured to provide a plurality of discrete heat output levels. The heating system is also configured to allow a variable speed air circulation fan to operate over a wider operating range to finely adjust the heat output of the heating system. The heating system may also be configured to employ the segmented gas manifold with a constant burner which allows a pulsed burner to rapidly toggle on and off to adjust the heat output of the heating system. The heating system may be configured to generate significantly less heat output than existing heating systems, which increases the overall range of temperatures and heat output that can be provided by the heating system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
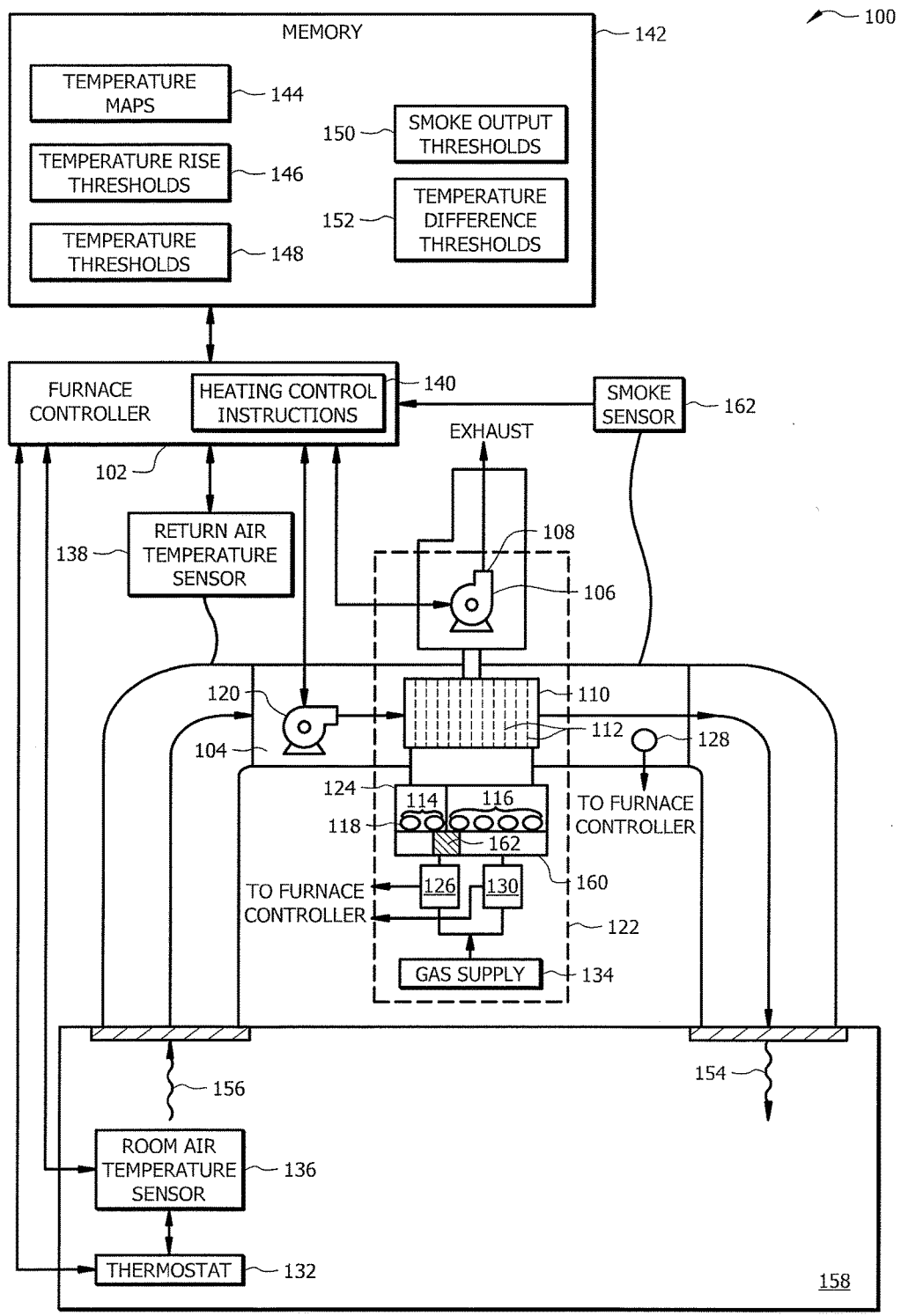
FIG. 1 is a schematic diagram of an embodiment of a heating system.

Disclosed herein are various embodiments for providing multi-stage heating control for a heating system to provide improved discharge air temperature control. Multi-stage heating control allows a heating system to determine and reconfigure the heating system to control the discharge air temperature using a temperature map. Using multi-stage heating control, the heating system can adjust the speed of an air circulation fan (ACF) to fine-tune the discharge air temperature and reconfigure itself to match a heating load based on load conditions.

In one embodiment, a heating system employing multi-stage heating control may be configured in a discharge air heating control mode to adjust a discharge or supply air temperature or temperature rise. The heating system is reconfigurable and may employ a variable speed ACF to provide a broad range of discharge air temperature or temperature rise outputs. Existing heating systems are unable to provide a wide range of operating speeds for the ACF due to overheating issues that occur when the ACF speed is reduced.

The heating system may also be configured in an anti-stratification mode to reduce temperature rise. The ability to reduce the temperature rise allows the heating system to resolve or avoid stratification within a room. Stratification is the condition where heat sits primarily in an upper portion of a room (e.g. near the ceiling) and does not disperse properly throughout the room. The heating system is configured to use air temperature sensors to detect conditions which may cause stratification and to adjust the discharge air temperature to reduce a temperature rise for a room in response to detecting these conditions. Reducing the temperature rise allows the heated air to diffuse better within the room.

The heating system may also be configured in an energy saving mode to operate in a low-energy mode by default, to transition to a higher-energy mode when necessary, and to transition from the higher-energy mode back to a low-energy mode whenever possible. Operating in the low-energy mode allows the heating system to operate in an energy saving state which delivers minimal temperature increase and allows the ACF to stay at a low speed to gradually heat up a room over a longer period of time. The heating system is configured to adjust the speed of the ACF when additional heat is required and then to adjust the speed back to a low-energy mode when the additional heat is no longer required.

The heating system may also be configured to operate in a rapid response heat control mode to quickly heat up a room without exceeding or overshooting a temperature set point. The heating system is configured to monitor and adjust discharge air temperature as the heating system rapidly provides heat to a room. The heating system is configured to provide enough heat to reach a target temperature set point without overheating and exceeding the temperature set point. As heat is provided to the room, the discharge air temperature or temperature rise is gradually reduced as the room air temperature approaches the temperature set point.

The heating system may also be configured to operate in a self-calibration mode to update default settings or temperature maps for the heating system based on environmental conditions. The heating system is configured to test and update factory default settings in a temperature map using information that is acquired from a job site.

The heating system may also be configured to operate in an auto heat commissioning mode to monitor smoke output while burning lubricants. The heating system is configured to adjust the heating temperatures used for burning lubricants during maintenance to control the smoke output of the heating system. Providing better temperature control of the heating temperatures for burning the lubricants may reduce the time for commissioning a heating system and may limit the formation of smoke when replacing a gas heat exchanger.

The heating system may also be configured to operate in a gas pulse modulation temperature control mode to adjust a discharge air temperature or temperature rise using a modulated pulsed burner. The heating system is configured to employ a constant burner which allows the heating system to remain lit and active with a modulated pulsed burner with an adjustable duty cycle. The duty cycle of the pulsed burner is adjusted to control the discharge air temperature of the heating system.

FIG. 1 is a schematic diagram of an embodiment of a heating system 100. An example of a heating system 100 includes, but is not limited to, a gas fired combustible fuel-air burning furnace. The heating system 100 may be for a residence or for a commercial building (e.g. a residential or commercial unit), for example, a rooftop unit (RTU). The heating system 100 may be utilized in single or multiple zoned systems.

The heating system 100 comprises an ACF 120, a heating unit 122, a return air temperature sensor 138, a discharge air sensor (DAS) 128, a room air temperature sensor 136, a smoke sensor 162, a thermostat 132, a furnace controller 102, and a memory 142. Portions of the heating system 100 may be contained within a cabinet 104. In some embodiments, the furnace controller 102 may be included within the cabinet 104. The heating system 100 may be configured as shown or in any other suitable configuration. The heating system 100 is configured to generate heat and to provide the generated heat to a conditioned space or room 158 to control the temperature within the room 158. The heating system 100 is configured to employ multi-stage heating control which allows the heating system 100 to configure itself to control the discharge air temperature and to adjust the speed of the ACF 120 to fine-tine the discharge air temperature. In one embodiment, the heating system 100 may be configured to achieve a five to one (5:1) turndown ratio or a seven to one (7:1) turndown ratio. A turndown ratio is the operation range of the heating system 100, for example, the ratio of the maximum output to the minimum output. Alternatively, the heating system 100 may be configured to achieve any other turndown ratio as would be appreciated by one of ordinary skill in the art upon viewing this disclosure.

The ACF 120 is a variable speed unit blower that is operably coupled to the furnace controller 102. The furnace controller 102 may adjust the speed of the ACF 120 to control the discharge air temperature or temperature rise of the heating system 100. The ACF 120 may be configured to operate at 10%, 25%, 50%, 75%, 100%, or any other suitable percentage of the maximum speed of the ACF 120. The ACF 120 is configured to circulate air between the cabinet 104 and the room 158. The ACF 120 is configured to pull return air 156 from the room 158, to communicate the return air 156 to the heating unit 122 to heat up the air, and to communicate the heated air as supply or discharge air 154 to the room 158.

The heating unit 122 comprises a burner assembly 124 having a plurality of burners 118, a heat exchanger 110, a combustion air inducer or combustion air blower (CAB) 106, a first gas valve 126, a second gas valve 130, and a gas supply 134. In one embodiment, the heating unit 122 is a single furnace. The heating unit 122 is configured to generate heat for heating air that is communicated from the ACF 120 to the room 158. The heating unit 122 is configurable between a plurality of configurations to adjust the amount of heat generated by the heating unit 122. For example, the heating unit 122 may be configured to generate 7%, 10%, 25% 53%, 64%, 75%, 100%, or any other suitable percentage of the maximum heat output of the heating unit 122.

The burner assembly 124 comprises a gas manifold 160 that includes a plug 162 disposed within the gas manifold 160 that separates the gas manifold 160 into segments and partitions the burners 118 into subsets. For example, the plug 162 is disposed within the gas manifold 160 and configured to form a first segment of the gas manifold 160 for a first set of burners 114 and a second segment of the gas manifold 160 for a second set of burners 116. The plug 162 is configured to disallow gas communication between segments (e.g. the first segment and the second segment) of the gas manifold 160.

Burners 118 are configured for burning a combustible fuel-air mixture (e.g. gas-air mixture) and to provide a combustion product to the heat exchanger 110. The burners 118 are separated into subsets of burners 118 and each set of burners 118 is connected to the fuel source or gas supply 134 via a gas valve. The ratio of burners 118 to gas valves can be adjusted to change the heat output of the heating unit 122 for various configurations of the heating unit 122. For example, a first set of burners 114 is connected to the gas supply 134 via the first gas valve 126 and a second set of burners 116 is connected to the gas supply 134 via the second gas valve 130. The first set of burners 114 and the second set of burners 116 may each comprise any suitable number of burners 118. The number of burners 118 in the first set of burners 114 and the second set of burners 116 may be the same or different. The burners 118 may be configured to stay active (i.e. on) during operation or to pulse (i.e. toggle between on and off) during operation. A burner 118 configured to stay active during operation is referred to as a constant burner 118 and a burner 118 configured to pulse during operation is referred to as a pulsed burner 118. A pulsed burner 118 has an adjustable duty cycle so that the percentage of the time period that the pulsed burner 118 is active is adjustable. The pulsed burner 118 is configured to be toggled or modulated using pulse width modulation (PWM). For example, a pulsed burner 118 may be modulated by the furnace controller 102 using pulse width modulation.

An example of the first gas valve 126 and the second gas valve 130 is a two-stage valve. The first gas valve 126 and the second gas valve 130 are configured to allow or disallow gas communication between the gas supply 134 and segments of the gas manifold 160. For example, the first gas valve 126 and the second gas valve 130 may be operable between an off configuration that substantially blocks gas flow between the gas supply 134 and the gas manifold 160, a low-fire rate configuration that allows a first pressure or flow rate of gas to be communicated to the burners 118, and a high-fire rate configuration that allows a second pressure or flow rate of gas that is higher than the first pressure to be communicated to the burners 118. The gas supply 134 is configured to store and provide a fuel or gas for the heating unit 122. The gas supply 134 is configured to store and provide any suitable combustible fuel or gas as would be appreciated by one of ordinary skill in the art upon viewing this disclosure.

The heat exchanger 110 comprises a plurality of tubes 112, for example, a tube for each burner 118. The heat exchanger 110 is configured to receive the combustion product from the burner assembly 124 and to use the combustion product to heat air that is blown across the heat exchanger 110 by the ACF 120.

The CAB 106 is configured to supply combustion air to the burner assembly 124 (i.e. the burners 118) using an induced draft and is also used to exhaust waste products of combustion from the heating system 100 through a vent 108. In an embodiment, the CAB 106 is operable between two speed settings, for example, a low speed that corresponds with the low-fire mode of operation for the burners 118 and a high speed that corresponds with the high-fire mode of operation for the burners 118. The CAB 106 is configured such that the low speed and the high speed correspond to the low-fire gas rate and the high-fire gas rate, respectively, to provide gas-fuel-mixture for the low-fire and high-fire modes of the heat exchanger 110. In one embodiment, the air-fuel mixture is substantially constant through the various heating unit 122 configurations.

The return air temperature sensor 138 is configured to determine a return air temperature for the heating system 100. For example, the return air temperature sensor 138 may be a temperature sensor configured to determine the ambient temperature of air that is returned to or entering the heating system 100 and to provide the temperature data to the furnace controller 102. In one embodiment, the return air temperature sensor 138 is located in the cabinet 104. Alternatively, the return air temperature sensor 138 may be positioned in other locations to measure the return air temperature for the heating system 100. For example, the return air temperature sensor 138 may be positioned in a duct between the cabinet 104 and the room 158.

An example of the DAS 128 includes, but is not limited to, a 10K Negative Temperature Coefficient (NTC) sensor. The DAS 128 is configured to determine a discharge or supply air temperature of the heating system 100. For example, the DAS 128 may be a temperature sensor configured to determine the ambient temperature of air that is discharged from the heating system 100 and to provide the temperature data to the furnace controller 102. In one embodiment, the DAS 128 is located in the cabinet 104. Alternatively, the DAS 128 may be positioned in other locations to measure the discharge air temperature of the heating system 100. For example, the DAS 128 may be positioned in a duct between the cabinet 104 and the room 158.

The room air temperature sensor 136 is configured to determine an air temperature for the room 158. For example, the room air temperature sensor 136 may be a temperature sensor configured to determine the ambient temperature of air of the room 158 and to provide the temperature data to the furnace controller 102. The room air temperature sensor 136 may be located anywhere within the room 158. The thermostat 132 may be a two-stage thermostat or any suitable thermostat employed in an HVAC system to generate heating calls based on a temperature setting as would be appreciated by one of ordinary skill in the art upon viewing this disclosure. The thermostat 132 is configured to allow a user to input a desired temperature or temperature set point for a designated area or zone such as the room 158.

An example of the smoke sensor 162 includes, but is not limited to, a carbon dioxide (CO2) sensor. The smoke sensor 162 is operably coupled to a duct between the cabinet 104 and the room 158 or to the vent 108. The smoke sensor 162 is configured to measure the amount of smoke in the air and to output a smoke output measurement based on the amount of smoke in the air.

The memory 142 may comprise one or more disks, tape drivers, or solid-state drives and may be used as an over-flow data storage device, to store programs when such programs are selected for execution, and to store instructions and data that are read during program execution. The memory 142 may be volatile or non-volatile and may comprise read-only memory (ROM), random-access memory (RAM), ternary content-addressable memory (TCAM), dynamic random-access memory (DRAM), and static random-access memory (SRAM). The memory 142 is operable to store a temperature map 144, temperature rise thresholds 146, temperature thresholds 148, smoke output thresholds 150, and temperature difference thresholds 152, among other information and data used to support the various modes of operation described herein. The temperature map 144 may comprise predetermined mappings between any combination of temperature, speeds of the ACF 120, configurations of the heating unit 122, duty cycles for pulsed burners 118, and smoke output measurements. For example, the temperature map 144 may map a first temperature to a first speed of the ACF 120, a second temperature to a second speed of the ACF 120, and so on. As another example, the temperature map 144 may map a first temperature to a first configuration of the heating unit 122, a second temperature to a second configuration of the heating unit 122, and so on. Additional details and examples of the temperature map 144 are described later in Tables 1-5. The temperature map 144 may be configured with any predetermined mapping or combination of mappings as would be appreciated by one of ordinary skill in the art upon viewing this disclosure. The temperature rise threshold 146, the temperature threshold 148, the smoke output threshold 150, and the temperature difference threshold 152 are dynamically determined or predetermined thresholds that may be used for calculations with respect to a temperature rise, temperature, smoke output, and temperature differences, respectively.

The furnace controller 102 may be implemented as one or more central processing unit (CPU) chips, logic units, cores (e.g. as a multi-core processor), field-programmable gate arrays (FPGAs), application specific integrated circuits (ASICs), or digital signal processors (DSPs). The furnace controller 102 is operably coupled to and in signal communication with the memory 142, the thermostat 132, the room air temperature sensor 136, the return air temperature sensor 138, the DAS 128, the smoke sensor 162, the first gas valve 126, the second gas valve 130, the ACF 120, and the CAB 106 via one or more input/output (I/O) ports. The furnace controller 102 is configured to receive and transmit electrical signals among one or more of the memory 142, the thermostat 132, the room air temperature sensor 136, the return air temperature sensor 138, the DAS 128, the smoke sensor 162, the first gas valve 126, the second gas valve 130, the ACF 120, and the CAB 106. The electrical signals may be used to send and receive data (e.g. temperature data) or to operate and control one or more components of the heating system 100. For example, the furnace controller 102 may transmit electrical signals to operate the ACF 120 and to adjust the speed of the ACF 120. The furnace controller 102 may be operably coupled to one or more other devices or pieces of HVAC equipment (not shown). The furnace controller 102 is configured to process data and may be implemented in hardware or software.

In FIG. 1, the heating control instructions 140 for the heating system 100 are implemented as instructions (e.g. software code or firmware) stored in the furnace controller 102. Alternatively, the heating control instructions 102 may be implemented as instructions stored in the memory 142. The inclusion of the heating control instructions 140 provides an improvement to the functionality of the heating system 100, which effects a transformation of the heating system 100 to a different state. The heating control instructions 140 are implemented by the furnace controller 102 to execute instructions for implementing various modes of operation for the heating system 100.

The heating control instructions 140 comprise instructions to operate the heating system 100 in a discharge air heating control mode to adjust a discharge air temperature or temperature rise by adjusting the speed of the ACF 120 and/or the configuration of the heating unit 122. Additional details and an example are discussed in FIG. 4.

The heating control instructions 140 also comprise instructions to operate the heating system 100 in an anti-stratification mode to reduce temperature rise for resolving or avoiding stratification within a room. The heating control instruction 140 configure the heating system 100 to use the DAS 128 or the return air sensor 138 and the room air temperature sensor 136 to detect conditions which may cause stratification and to adjust the discharge air temperature by adjusting the speed of the ACF 120 and/or the configuration of the heating unit 122 in response to detecting these conditions. Additional details and an example are discussed in FIG. 5.

The heating control instructions 140 also comprises instructions to operate the heating system 100 in an energy saving mode to operate in a low-energy mode by default, to transition to a higher-energy mode when necessary, and to transition from the higher-energy mode to the low energy state whenever possible. Additional details and examples are discussed in FIGS. 6 and 7.

The heating control instructions 140 also comprise instructions to operate the heating system 100 in a rapid response heat control mode to quickly heat up a room without exceeding a temperature set point. The heating control instructions 140 configure the heating system 100 to monitor and adjust discharge air temperature by gradually adjusting the speed of the ACF 120 and/or the configuration of the heating unit 122 as the heating system 100 rapidly provides heat to reach a target temperature set point without overheating and passing the temperature set point. Additional details and examples are discussed in FIGS. 8 and 9.

The heating control instructions 140 also comprise instructions to operate the heating system 100 in a self-calibration mode to update temperature maps 144 for the heating system 100 based on environmental conditions. The heating control instructions 140 configure the heating system 100 to test and modify factory default settings or mappings in the temperature map 144 using information that is acquired from the location of the heating system 100. Additional details and examples are discussed in FIGS. 10-12.

The heating control instructions 140 also comprise instructions to operate the heating system 100 in an auto heat commissioning mode to monitor smoke output while burning lubricants. The heating control instructions 140 configures the heating system 100 to adjust temperatures used for burning lubricants during maintenance by adjusting the speed of the ACF 120 and/or the configuration of the heating unit 122 to control the smoke output of the heating system. Additional details and examples are discussed in FIGS. 13 and 14.

The heating control instructions 140 also comprises instructions for operating the heating system 100 in a gas pulse modulation temperature control mode to adjust a discharge air temperature or temperature rise using a pulsed burner 118. The heating control instructions 140 configures the heating system 100 to employ a constant burner 118 which allows the heating system 100 to remain lit and active with a modulated pulsed burner 118 with an adjustable duty cycle that is used to adjust and control the discharge air temperature. Additional details and an example are discussed in FIG. 15.

Additional information about the heating system 100 is described in U.S. patent application Ser. No. 14/976,354 entitled, "MULTIPLE STAGE MODULATING GAS FIRED HEAT EXCHANGER," by Steven Schneider, et al., filed on Dec. 21, 2015 and U.S. patent application Ser. No. 14/976,485 entitled, "FIELD CONVERSION OF A HEATING SYSTEM TO A MULTIPLE STAGE MODULATING GAS FIRED HEAT EXCHANGER," by Steven Schneider, et al., filed on Dec. 21, 2015, which are both hereby incorporated by reference as if reproduced in their entirety.

Figure 2:
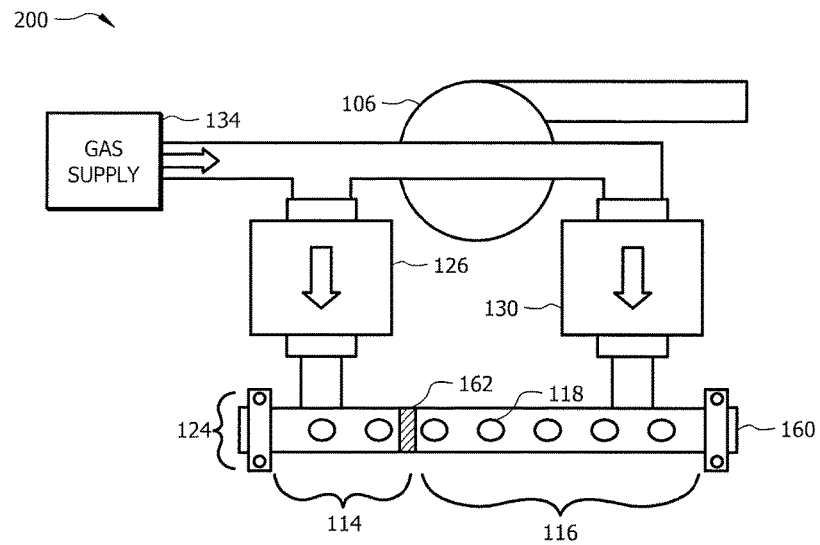
FIG. 2 is a schematic diagram of an embodiment of a portion of a heating unit for a heating system.

FIG. 2 is a schematic diagram of an embodiment of a portion 200 of a heating unit 122 for a heating system 100. The portion 200 of the heating unit 122 is reconfigurable between a plurality of configurations to adjust the amount of heat generated and outputted by the heating unit 122. The amount of heat generated by the heating unit 122 is based on the number of burners 118 that are active and the amount of pressure or flow rate of the gas valves that are operably coupled to the active burners 118.

The portion 200 comprises the gas supply 134, the CAB 106, the first gas valve 126, the second gas valve 130, and the burner assembly 124 that comprises the gas manifold 160, the plug 162, and the burners 118. The plug 162 is disposed within the gas manifold 160 and configured to form a first segment of the gas manifold 160 for a first set of burners 114 and a second segment of the gas manifold 160 for a second set of burners 116. The plug 162 is configured to disallow gas communication between segments of the gas manifold 160. In another embodiment, the gas manifold 160 may comprise one or more additional plugs (not shown). In such an embodiment, the gas manifold 160 may be partitioned into more than two segments and may support more than two subsets of burners 118.

In FIG. 2, the first set of burners 114 has two burners 118 and the second set of burners 116 has five burners 118. In other embodiments, the first set of burners 114 and the second set of burners 116 may comprise any suitable number of burners 118 to achieve desired operations. The number of burners 118 in the first set of burners 114 and the second set of burners 116 may be the same or different. The first set of burners 114 and the second set of burners 116 are configured to operate independently. For example, the burner assembly 124 may be configured such that both the first set of burners 114 and the second set of burners 116 are active, one of the first set of burners 114 or the second set of burners 116 is inactive, or both the first set of burners 114 and the second set of burners 116 is inactive A burner 118 is active (i.e. on) when the burner 118 is in a low-fire mode or in a high-fire mode. When the burner 118 is in the low-fire mode, the respective gas valve is configured to operate at the low-fire rate and the CAB 106 is configured to operate at a low speed. When the burner 118 is in the high-fire mode, the respective gas valve is configured to operate at the high-fire rate and the CAB 106 is at the configured to operate at a high speed. A burner 118 is inactive when the burner 118 is in an off state or mode. When the burner 118 is in the off mode, the respective gas valve is configured to disallow gas communication to the burner 118.

Figure 3:
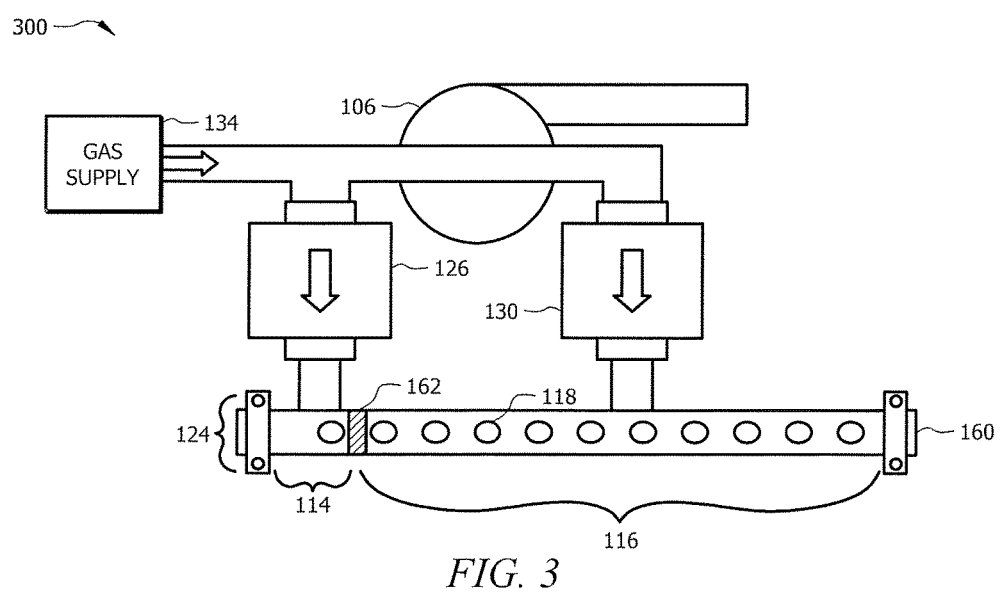
FIG. 3 is a schematic diagram of another embodiment of a portion of a heating unit for a heating system.

FIG. 3 is a schematic diagram of another embodiment of a portion 300 of a heating unit 122 for a heating system 100. The portion 300 comprises the gas supply 134, the CAB 106, the first gas valve 126, the second gas valve 130, and the burner assembly 124 that comprises the gas manifold 160, the plug 162, and the burners 118. The portion 300 of the heating unit 122 is configured to adjust the amount of heat generated and outputted by the heating unit 122 using one or more pulsed burners 118. The amount of heat generated by the heating unit 122 is based on the number of burners 118 that are active, the amount of pressure or flow rate of the gas valves that are operably coupled to the active burners 118, and the percentage of a time period that the pulsed burners 118 are active (i.e. the duty cycle of the pulsed burners 118).

In FIG. 3, the burner assembly 124 is configured such that the first set of burners 114 has one burner 118 and the second set of burners 116 has ten burners 118. The first set of burners 114 and the second set of burners 118 may be configured to operate either as constant burners 118 or pulsed burners 118. A burner 118 is a constant burner 118 when the burner 118 is configured to remain active, for example, in either the low-fire mode or the high-fire mode during operating. A burner 118 is a pulsed burner 118 when the burner 118 is configured to toggle between being active and inactive, for example, between the low-fire mode or the high-fire mode and the off mode. The percentage of a time period that the pulsed burners 118 are active (i.e. the duty cycle of the pulsed burners 118) is adjustable. The duty cycle of the pulsed burner 118 may be modulated or varied to generate different amounts of heat. The amount of heat generated by the pulsed burner 118 is proportional to the duty cycle of the pulsed burner 118, for example, a low duty cycle (e.g. less than 50%) generates less heat than a high duty cycle (e.g. greater than 50%). Pulsed burners 118 may be toggled or modulated by the furnace controller 102 using pulse width modulation or any other suitable modulation technique as would be appreciated by one of ordinary skill in the art upon viewing this disclosure.

In one embodiment, the first set of burners 114 are configured as constant burners and the second set of burners 116 are configured as pulsed burners 118. The first set of burners 114 is configured to remain active during operation. Keeping the first set of burners 114 in an active mode during operation allows the second set of burners 116 to operate as pulsed burners 118 and to toggle rapidly between an active and inactive mode without the typical delays associated with activating burners 118. For example, the heating system 100 can bypass the initialization process for turning on the heating system 100. The second set of burners 116 is configured to be modulated by the furnace controller 102 to adjust the amount of heat output.

Tables 1-5 illustrate various combinations of parameters and mappings between the parameters that may be used in a temperature map 144. Tables 1-5 are not intended to be limiting and are provided for illustrative purposes only. Tables 1-5 provide examples of temperature maps 144 that may be employed by the furnace controller 102 to operate the heating system 100 in various modes of operation such as the methods described in FIGS. 4-6, 8, 10, 11, and 13-15. The usage of a temperature map 144 is described in more detail later with respect to the methods described in FIGS. 4-6, 8, 10, 11, and 13-15.

Table 1 is one embodiment of a temperature map 144 for a heating system 100. Table 1 illustrates a temperature map 144 that may be used to adjust the speed of the ACF 120 to control temperature rise and temperature of the supply air. The temperature map 144 provides a mapping among the heat output of the heating unit 122 in terms of the percentage of the maximum heat input, the speed of the ACF 120 in cubic feet per minute (CFM), the temperature rise, and the temperature of the supply air. Table 1 illustrates that with a constant heat output (e.g. 64%) from the heating unit 122 the speed of the ACF 120 can be varied to adjust the temperature rise and the temperature of the supply air. As the speed of the ACF 120 increases, the temperature rise decreases and the temperature of the supply air decreases. The furnace controller 102 may use Table 1 to increase the speed of the ACF 120 to reduce the amount of heat that is provided by the heating system 100. As the speed of the ACF 120 decreases, the temperature rise increases and the temperature of the supply air increases. The furnace controller 102 may use Table 1 to decrease the speed of the ACF 120 to increase the amount of heat that is provided by the heating system 100.

TABLE 1

An embodiment of a temperature map 144 for a heating system 100

| % Input | CFM | Temp Rise | Supply Air |
|---|---|---|---|
| 64% | 4000 | 28 | 93 |
| 64% | 3600 | 32 | 97 |

TABLE 1-continued

An embodiment of a temperature map 144 for a heating system 100

| % Input | CFM | Temp Rise | Supply Air |
|---|---|---|---|
| 64% | 3300 | 34 | 99 |
| 64% | 3250 | 35 | 100 |
| 64% | 3200 | 36 | 101 |

Table 2 is one embodiment of temperature map 144 with four heating unit 122 configurations. Table 2 illustrates a temperature map 144 that may be used to adjust the number of active burners 118 and the operating mode (e.g. low-fire rate or high-fire rate) of the gas valves coupled to the active burners 118 in the heating unit 122 to control the amount of heat generated and outputted by the heating system 100. The temperature map 144 provides a mapping among four heat stages or configurations of the heating unit 122 (e.g. heat stages 1-4), the heat output of the heating unit 122 in terms of the percentage of the maximum heat input, the operation mode (e.g. low speed or high speed) of the CAB 106, the operation mode (e.g. low-fire rate or high-fire rate) of the first gas valve 126, and the operation mode (e.g. low-fire rate or high-fire rate) of the second gas valve 130. The first gas valve 126 and the second gas valve 130 may each be operably coupled to any suitable number of burners 118. When the heating unit 122 is in a first configuration (e.g. heat stage 1), the CAB 106 is configured to operate at a low speed, the first gas valve 126 is configured to operate at a low-fire rate, and the second gas valve 130 is inactive. In the first configuration, the heating unit 122 is configured to output about 7% of the maximum heat input. In the first configuration, the heating unit 122 uses the least amount of energy with respect to the other configurations to produce a heat output that is less than the maximum achievable heat output. When the heating unit 122 is in a second configuration (e.g. heat stage 2), the CAB 106 is configured to operate at a high speed, the first gas valve 126 is configured to operate at a high-fire rate, and the second gas valve 130 is inactive. In the second configuration, the heating unit 122 is configured to output about 9% of the maximum heat input. In the second configuration, the heating unit 122 uses more energy than the first configuration by increasing the pressure of the first gas valve 126. The increased pressure of the first gas valve 126 allows the heating unit 122 to provide a heat output that is greater than the heat output of the first configuration, but is still less than the maximum achievable heat output. When the heating unit 122 is in a third configuration (e.g. heat stage 3), the CAB 106 is configured to operate at a low speed and the first gas valve 126 and the second gas valve 130 are configured to operate at a low-fire rate. In the third configuration, the heating unit 122 is configured to output about 75% of the maximum heat input. In the third configuration, the heating unit 122 uses more energy than the second configuration, but still uses less energy than is required to achieve the maximum achievable heat output. In an another embodiment, the third configuration may be configured to output any other percentage of the maximum heat input that is greater than the second configuration and less than the maximum achievable heat output. In yet another embodiment, one or more additional configuration may exist between the second configuration and the third configuration to provide more configurations to more gradually adjust the heat output of the heating unit 122. When the heating unit 122 is in a fourth configuration (e.g. heat stage 4), the CAB 106 is configured to operate at a high speed and the first gas valve 126 and the second gas valve 130 are configured to operate at a high-fire rate. In the fourth configuration the heating unit 122 is configured to output about 100% of the maximum heat input. In the fourth configuration, the heating unit 122 uses the most amount of energy with respect to the other configurations to provide the maximum achievable heat output.

Table 2 illustrates that the supply air temperature or temperature rise increases when the CAB 106 transitions from operating at a low speed to operating at a high speed and a gas valve transitions from operating at a low-fire rate to operating at a high-fire rate. Using a temperature map 144 like Table 2, the furnace controller 102 may reconfiguring the heating unit 122 to use more energy by operating the CAB 106 at a high speed and operating the gas valve at a high-fire rate allows the heating unit 122 to generate and output more heat. The supply air temperature or temperature rise also increases when a gas valve (e.g. the second gas valve 130) transitions from being inactive to active, for example, from an off mode to a low-fire rate or to a high-fire rate. Using a temperature map 144 like Table 2, the furnace controller 102 may reconfiguring the heating unit 122 to use less energy by operating the CAB 106 at a low speed and operating the gas valve at a low-fire rate allows the heating unit 122 to generate and output less heat.

TABLE 2

An embodiment of a temperature map 144 with four heating unit 122 configurations

| Heat stage | % of Input | CAB | GV1 | GV2 |
|---|---|---|---|---|
| 1 | 7% | Low | Low | Off |
| 2 | 9% | High | High | Off |
| 3 | 75% | Low | Low | Low |
| 4 | 100% | High | High | High |

Table 3 is one embodiment of a temperature map 144 with six heating unit 122 configurations. Table 3 illustrates that increasing the number of configurations of the heating unit 122 provides more heat output levels to more finely control a room temperature. Table 3 illustrates a temperature map 144 that can be used to adjust the number of active burners 118 and the operating mode of the gas valve operably coupled to active burners 118 to control the heat output of the heating unit 122. The temperature map 144 provides a mapping among six heat stages or configurations of the heating unit 122 (e.g. heat stages 1-6), the heat output of the heating unit 122 in terms of the percentage of the maximum heat input, the operation mode (e.g. low speed or high speed) of the CAB 106, the operation mode (e.g. low-fire rate or high-fire rate) of the first gas valve 126, and the operation mode (e.g. low-fire rate or high-fire rate) of the second gas valve 130. In Table 3, the first gas valve 126 is operably coupled to two burners 118 and the second gas valve 130 is operably coupled to five burners 118. The number of burners 118 that are operably coupled to the first gas valve 126 and the second gas valve 130 may be adjusted to vary the amount of energy that is used and the amount of heat that is generated. For example, increasing the number of burners 118 that are operably coupled to the first gas valve 126 will increase the amount of energy that is used and increase the heat output of the heating unit 122 when the first gas valve 126 is active.

When the heating unit 122 is in a first configuration (e.g. heat stage 1), the CAB 106 is configured to operate at a low speed, the first gas valve 126 is configured to operate at a low-fire rate, and the second gas valve 130 is inactive. In the first configuration, the heating unit 122 is configured to output about 21% of the maximum heat input. In the first configuration, the heating unit 122 uses the least amount of energy with respect to the other configurations by operating the CAB 106 at the low speed and using the least amount of active burners 118. When the heating unit 122 is in a second configuration (e.g. heat stage 2), the CAB 106 is configured to operate at a high speed, the first gas valve 126 is configured to operate at a high-fire rate, and the second gas valve 130 is inactive. In the second configuration, the heating unit 122 is configured to output about 29% of the maximum heat input. In the second configuration, the heating unit 122 uses more heat than the first configuration by increasing the speed of the CAB 106 and the fire rate of the first gas valve 126 that is operably coupled to the active burners 118. When the heating unit 122 is in a third configuration (e.g. heat stage 3), the CAB 106 is configured to operate at a low speed, the first gas valve 126 is inactive, and the second gas valve 130 is configured to operate at a low-fire rate. In the third configuration, the heating unit 122 is configured to output about 53% of the maximum heat input. In the third configuration, the heating unit 122 uses more energy and provides a higher heat output than the second configuration by switching from the first gas valve 126 to the second gas valve 130 which increases the number of burners 118 that are active. In this example, the number of active burners 118 increases from two to five. When the heating unit 122 is in a fourth configuration (e.g. heat stage 4), the CAB 106 is configured to operate at a high speed, the first gas valve 126 is inactive, and the second gas valve 130 is configured to operate at a high-fire rate. In the fourth configuration, the heating unit 122 is configured to output about 71% of the maximum heat input. In the fourth configuration, the heating unit 122 uses more energy and provides a higher heat output than the third configuration by increasing the speed of the CAB 106 and the flow rate of the second gas valve 130. When the heating unit 122 is in a fifth configuration (e.g. heat stage 5), the CAB 106 is configured to operate at a low speed and the first gas valve 126 and the second gas valve 130 are configured to operate at a low-fire rate. In the fifth configuration, the heating unit 122 is configured to output about 75% of the maximum heat input. In the fifth configuration, the heating unit uses more energy than the fourth configuration, but still uses less energy than required to achieve the maximum achievable heat output by activating both the first gas valve 126 and the second gas valve 130 which activates all of the burners 118. When the heating unit 122 is in a sixth configuration (e.g. heat stage 6), the CAB 106 is configured to operate at a high speed and the first gas valve 126 and the second gas valve 130 are configured to operate at a high-fire rate. In the sixth configuration, the heating unit 122 is configured to output about 100% of the maximum heat input. In the sixth configuration, the heating unit 122 is configured to use the most amount of energy with respect to the other configurations to provide the maximum achievable heat output. The heating unit 122 increases the heat output from the fifth configuration by operating the CAB 106 at a high speed and operating both the first gas valve 126 and the second gas valve 130 at a high-flow rate which activates all of the burners 118 at a high-fire rate.

Using a temperature map 144 like Table 3, the furnace controller 102 may reconfigure the number of active burners 118 by activating the first gas valve 126 and/or the second gas valve 130 and the operating mode of the active burners 118 to control the heat output of the heating unit 122.

TABLE 3

An embodiment of a temperature map 144 with six heating unit 122 configurations

| Heat stage | % of Input | CAB | GV1 | GV1 | GV2 | GV2 | GV2 | GV2 | GV2 |
|---|---|---|---|---|---|---|---|---|---|
| 1 | 21% | Low | Low | Low | Off | Off | Off | Off | Off |
| 2 | 29% | High | High | High | Off | Off | Off | Off | Off |
| 3 | 53% | Low | Off | Off | Low | Low | Low | Low | Low |
| 4 | 71% | High | Off | Off | High | High | High | High | High |
| 5 | 75% | Low | Low | Low | Low | Low | Low | Low | Low |
| 6 | 100% | High | High | High | High | High | High | High | High |

Table 4 is an embodiment of a temperature map 144 with six heating unit 122 configurations at different ACF 120 speeds. Table 4 illustrates a temperature map 144 that uses the combination of the configuration of the heating unit 122 and the speed of the ACF 120 to adjust and control heat output and a room temperature. The temperature map 144 provides a mapping among the heat output of the heating unit 122 in terms of the percentage of the maximum heat input, the speed of the ACF 120 in CFM, and the temperature rise for six heating unit 122 configurations (e.g. heat stages 1-6). When the heating unit 122 is in a first configuration (e.g. heat stage 1), the heating unit 122 is configured to output about 20% of the maximum heat input. In the first configuration, the heating unit 122 uses the least amount of energy with respect to the other configurations. The speed of the ACF 120 may be varied while the heating unit 122 is in the first configuration to adjust the temperature rise. The furnace controller 102 may increase the speed of the ACF 120 to reduce the temperature rise and decrease the speed of the ACF 120 to increase the temperature rise while the heating unit 122 is in the first configuration. When the heating unit 122 is in a second configuration (e.g. heat stage 2), the heating unit 122 is configured to output about 36% of the maximum heat input. In the second configuration, the heating unit 122 uses more energy than when the heating unit 122 is in the first configuration. For example, the heating unit 122 may increase the number of active burners 118 or transition the operating mode of the gas valves operably coupled to the active burners 118 to a high-flow rate. The furnace controller 102 may adjust the speed of the ACF 120 when the heating unit 122 is in the second configuration to further adjust the temperature rise. The temperature range and temperatures that are achievable when the heating unit 122 is in the second configuration are greater than when the heating unit 122 is in the first configuration. When the heating unit 122 is in a third configuration (e.g. heat stage 3), the heating unit 122 is configured to output about 51% of the maximum heat input. In the third configuration, the heating unit 122 uses more energy than when the heating unit 122 is in the second configuration. The furnace controller 102 may adjust the speed of the ACF 120 when the heating unit 122 is in the third configuration to further adjust the temperature rise. When the heating unit 122 is in a fourth configuration (e.g. heat stage 4), the heating unit 122 is configured to output about 64% of the maximum heat input. In the fourth configuration, the heating unit 122 uses more energy than when the heating unit 122 is in the third configuration. The furnace controller 102 may adjust the speed of the ACF 120 when the heating unit 122 is in the fourth configuration to further adjust the temperature rise. When the heating unit 122 is in a fifth configuration (e.g. heat stage 5), the heating unit 122 is configured to output about 80% of the maximum heat input. In the fifth configuration, the heating unit 122 uses more energy than when the heating unit 122 is in the fourth configuration. The furnace controller 102 may adjust the speed of the ACF 120 when the heating unit 122 is in the fifth configuration to further adjust the temperature rise. When the heating unit 122 is in a sixth configuration (e.g. heat stage 6), the heating unit 122 is configured to output about 100% of the maximum heat input. In the sixth configuration, the heating unit 122 uses the most energy to achieve the highest temperature rise temperatures. The furnace controller 102 may adjust the speed of the ACF 120 when the heating unit 122 is in the sixth configuration to further adjust the temperature rise.

Table 4 illustrates that for each heating unit 122 configuration, the speed of the ACF 120 can be varied to adjust the temperature rise. As the speed of the ACF 120 increases, the temperature rise decreases. As the speed of the ACF 120 decreases, the temperature rise increases. Using a temperature map 144 like Table 4, the furnace controller 102 may reconfigure the heating unit 122 and/or adjust the speed of the ACF 120 to control the temperature rise.

TABLE 4

An embodiment of a temperature map 144 with six heating unit 122 configurations at different ACF 120 speeds

| % Input | CFM | Temp Rise | % Input | CFM | Temp Rise | % Input | CFM | Temp Rise |
|---|---|---|---|---|---|---|---|---|
| Stage 1 | | | Stage 2 | | | Stage 3 | | |
| 20% | 250 | 89 | 36% | 250 | 160 | 51% | 250 | 227 |
| 20% | 500 | 44 | 36% | 500 | 80 | 51% | 500 | 113 |
| 20% | 750 | 30 | 36% | 750 | 53 | 51% | 750 | 76 |
| 20% | 1000 | 22 | 36% | 1000 | 40 | 51% | 1000 | 57 |
| 20% | 1250 | 18 | 36% | 1250 | 32 | 51% | 1250 | 45 |
| 20% | 1500 | 15 | 36% | 1500 | 27 | 51% | 1500 | 38 |
| 20% | 1750 | 13 | 36% | 1750 | 23 | 51% | 1750 | 32 |
| 20% | 2000 | 11 | 36% | 2000 | 20 | 51% | 2000 | 28 |
| 20% | 2250 | 10 | 36% | 2250 | 18 | 51% | 2250 | 25 |
| 20% | 2500 | 9 | 36% | 2500 | 16 | 51% | 2500 | 23 |
| 20% | 2750 | 8 | 36% | 2750 | 15 | 51% | 2750 | 21 |
| 20% | 3000 | 7 | 36% | 3000 | 13 | 51% | 3000 | 19 |
| 20% | 3250 | 7 | 36% | 3250 | 12 | 51% | 3250 | 17 |
| 20% | 3500 | 6 | 36% | 3500 | 11 | 51% | 3500 | 16 |
| 20% | 3750 | 6 | 36% | 3750 | 11 | 51% | 3750 | 15 |
| 20% | 4000 | 6 | 36% | 4000 | 10 | 51% | 4000 | 14 |
| Stage 4 | | | Stage 5 | | | Stage 6 | | |
| 64% | 250 | 284 | 80% | 250 | 356 | 100% | 250 | 444 |
| 64% | 500 | 142 | 80% | 500 | 178 | 100% | 500 | 222 |
| 64% | 750 | 95 | 80% | 750 | 119 | 100% | 750 | 148 |
| 64% | 1000 | 71 | 80% | 1000 | 89 | 100% | 1000 | 111 |
| 64% | 1250 | 57 | 80% | 1250 | 71 | 100% | 1250 | 89 |
| 64% | 1500 | 47 | 80% | 1500 | 59 | 100% | 1500 | 74 |
| 64% | 1750 | 41 | 80% | 1750 | 51 | 100% | 1750 | 63 |
| 64% | 2000 | 36 | 80% | 2000 | 44 | 100% | 2000 | 56 |
| 64% | 2250 | 32 | 80% | 2250 | 40 | 100% | 2250 | 49 |
| 64% | 2500 | 28 | 80% | 2500 | 36 | 100% | 2500 | 44 |
| 64% | 2750 | 26 | 80% | 2750 | 32 | 100% | 2750 | 40 |
| 64% | 3000 | 24 | 80% | 3000 | 30 | 100% | 3000 | 37 |
| 64% | 3250 | 22 | 80% | 3250 | 27 | 100% | 3250 | 34 |
| 64% | 3500 | 20 | 80% | 3500 | 25 | 100% | 3500 | 32 |
| 64% | 3750 | 19 | 80% | 3750 | 24 | 100% | 3750 | 30 |
| 64% | 4000 | 18 | 80% | 4000 | 22 | 100% | 4000 | 28 |

Table 5 is one embodiment of a temperature map 144 that provides a mapping between the duty cycle for a pulsed burner 118 and the temperature of the supply air. Table 5 illustrates a temperature map 144 that uses the duty cycle of a pulsed burner 118 can be adjusted to control a room temperature when the heating unit 122 is configured with a constant burner 118 and a pulsed burner 118. The duty cycle of the pulsed burner 118 is the percentage of the time period that the pulsed burner 118 is active. Table 5 illustrates that the duty cycle of the pulsed burner 118 can be varied to adjust the temperature rise or the temperature of the supply air. As the duty cycle of the pulsed burner 118 increases, the temperature of the supply air increases. The furnace controller 102 can increase the temperature of the supply air by configuring the pulsed burner 118 with a higher duty cycle to stay active for a longer period of time. As the duty cycle of the pulsed burner 118 decreases, the temperature of the supply air decreases. The furnace controller 102 can decrease the temperature of the supply air by configuring the pulsed burner 118 with a lower duty cycle to stay active for a shorter period of time.

TABLE 5

An embodiment of a temperature map 144 for a heating unit 122 with a pulsed burner 118

| Duty Cycle | Temperature |
| --- | --- |
| 10% | 23 |
| 20% | 25 |
| 30% | 28 |
| 40% | 32 |
| 50% | 38 |
| 60% | 45 |
| 70% | 57 |
| 80% | 76 |
| 90% | 113 |
| 100% | 227 |

FIGS. 4-6, 8, 10, 11, and 13-15 are embodiments of various operating modes for the heating system 100. The heating system 100 may be configured to implement any combination of the following operating modes to control a room temperature or the heat output of the heating system 100. Additional information for each operating mode will be disclosed herein. One of ordinary skill in the art would appreciate that alternative embodiments of the operating modes described in FIGS. 4-6, 8, 10, 11, and 13-15 also exist for adjusting other temperature or heat output parameters (e.g. temperature rise or supply air temperature) without departing from the spirit or scope of the present disclosure.

Figure 4:
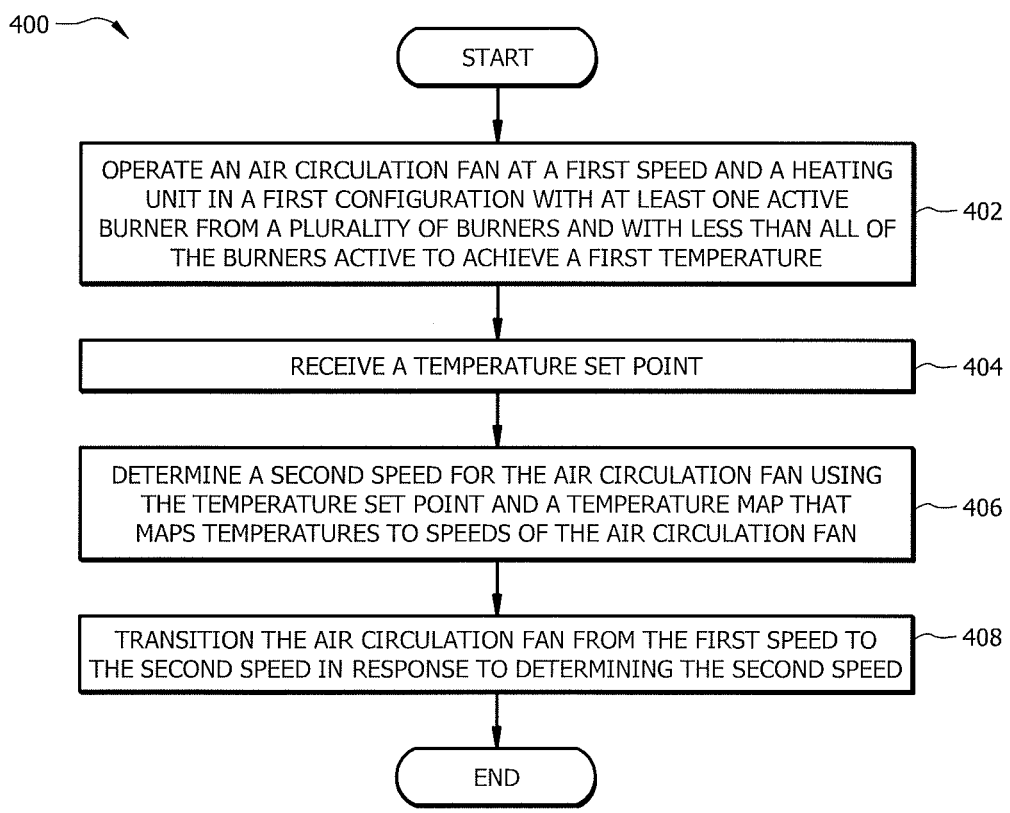
FIG. 4 is a flowchart of an embodiment of a heating control method for operating a heating system in a discharge air heating control mode.

FIG. 4 is a flowchart of one embodiment of a heating control method 400 for operating a heating system 100 in a discharge air heating control mode. In a discharge air heating control mode the discharge air temperature or temperature rise can be adjusted by varying the speed of the ACF 120. Method 400 is implemented by furnace controller 102 to adjust a discharge air temperature or temperature rise.

At step 402, the furnace controller 102 operates the ACF 120 at a first speed and the heating unit 122 in a first configuration with at least one active burner 118 from a plurality of burners 118 and with less than all of the burners 118 active to achieve a first temperature. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration. At step 404, the furnace controller 102 receives a temperature set point, for example, from the thermostat 132. The temperature set point indicates a desired room temperature or supply air temperature for a room 158 or conditioned space. At step 406, the furnace controller 102 determines a second speed for the ACF 120 using the temperature set point and a temperature map 144 that maps temperatures to speeds of ACF 120. For example, the furnace controller 102 may use a temperature map 144 similar to Table 1 or Table 4. The furnace controller 102 may use the temperature set point as a key to look up an entry in the temperature map 144 that corresponds with the temperature set point (e.g., the supply air temperature) to identify the second speed for the ACF 120 from the temperature map 144. In one embodiment, the second speed may be less than the first speed to provide more heat. As the speed of the ACF 120 decreases, the amount of air provided by the ACF 120 is reduced which leads to a increase in the amount of heat that is provided by the heating system 100 and an increase in the output temperature of the heating system 100. Alternatively, the second speed may be greater than the first speed to provide less heat. As the speed of the ACF 120 increases, the amount of air provided by the ACF 120 increases which leads to a decrease in the amount of heat that is provided by the heating system 100 and a decrease in the output temperature of the heating system 100. At step 408, the furnace controller 102 transitions the ACF 120 from the first speed to the second speed in response to determining the second speed. The furnace controller 102 may transmit one or more electrical signal to transition the ACF 120 from the first speed to the second speed.

In one embodiment, the temperature map 144 may also map temperatures to configurations for the heating unit 122. In such an embodiment, the furnace controller 102 may determine a second configuration for the heating unit 122 using the temperature set point and the temperature map 144. For example, the temperature map 144 may be similar to Table 4. The furnace controller 102 may transition the heating unit 122 from the first configuration to the second configuration in response to determining the second configuration. For example, the furnace controller 102 may transition the heating unit 122 from the first configuration to the second configuration in addition to adjusting the speed of the ACF 120 or as an alternative to adjusting the speed of the ACF 120. The furnace controller 102 may transmit one or more electrical signal to transition the heating unit 122 from the first configuration to the second configuration. Transitioning the heating unit 122 from the first configuration to the second configuration to provide more heat may comprise switching from the first set of active burners to a second set of active burners that comprises more burners 118 than the first set of active burners. Switching from the first set of active burners to the second set of active burners increases the overall number of active burners 118, which allows the heating unit 122 to generate and to output more heat. Alternatively, transitioning the heating unit 122 from the first configuration to the second configuration to provide more heat may comprise activating a second set of burners. For example, the heating unit 122 may operate using both the first set of active burners and the second set of active burners. Operating the heating unit 122 with both the first set of active burners and the second set of active burners also increases the overall number of active burners 118 and allows the heating unit 122 to generate and to output more heat. Additionally or alternatively, transitioning the heating unit 122 to the second configuration to provide more heat may comprise increasing the speed of the CAB 106 and the pressure to a gas valve operably coupled to the first set of active burners to transition the first set of active burners from a low-fire mode to a high-fire mode. Increasing the speed of the CAB 106 and the pressure of the gas valve that is operably coupled to the first set of active burners allows the actives burners 118 to use more energy to generate and output more heat. Transitioning the heating unit 122 from the first configuration to the second configuration to provide less heat may comprise switching from the first set of active burners to a second set of active burners that comprises fewer burners 118 than the first set of active burners. Switching from the first set of active burners to the second set of active burners reduces the overall number of active burners 118, which causes the heating unit 122 to generate and to output less heat. Additionally or alternatively, transitioning the heating unit 122 from the first configuration to the second configuration to produce less heat may comprise decreasing the speed of the CAB 106 and the pressure to a gas valve operably coupled to the first set of active burners to transition the first set of active burners from a high-fire mode to a low-fire mode. Decreasing the speed of the CAB 106 and the pressure of the gas valve that is operably coupled to the first set of active burners causes the active burners 118 to use less energy to generate and output less heat.

Figure 5:
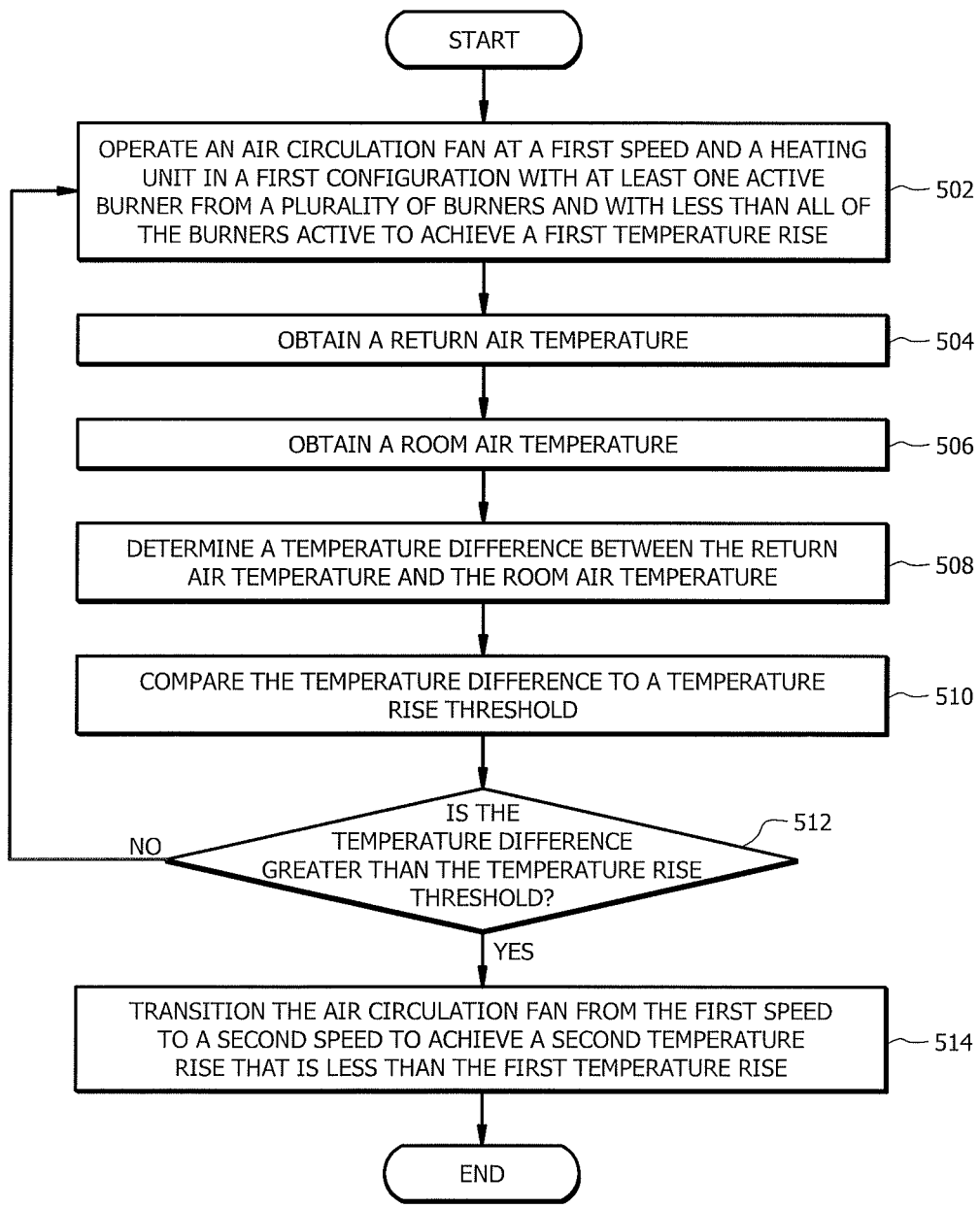
FIG. 5 is a flowchart of an embodiment of a heating control method for operating a heating system in an anti-stratification mode.

FIG. 5 is a flowchart of one embodiment of a heating control method 500 for operating a heating system 100 in an anti-stratification mode. In an anti-stratification mode the temperature rise can be reduced to resolve or to avoid stratification within a room 158. Method 500 is implemented by furnace controller 102 to reduce temperature rise within a room 158.

At step 502, the furnace controller 102 operates the ACF 120 at a first speed and the heating unit 122 in a first configuration with at least one active burner 118 from a plurality of burners 118 and with less than all of the burners 118 active to achieve a first temperature rise. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration.

At step 504, the furnace controller 102 obtains a return air temperature using the return air sensor 138. At step 506, the furnace controller 102 obtains a room air temperature using the room air temperature sensor 136. At step 508, the furnace controller 102 determines a temperature difference between the return air temperature and the room air temperature. The temperature difference between the return air temperature and the room air temperature corresponds with the temperature rise for the room 158 which may be used to determine whether stratification is occurring or may occur. In another embodiment, the furnace controller 102 may obtain a supply air temperature using the DAS 128 and determine the temperature difference between the supply air temperature and the return air temperature or the temperature difference between the supply air temperature and the room air temperature. The temperature difference between the supply air temperature and the return air temperature also corresponds with the temperature rise for the room 158 and may be used to determine whether stratification is occurring or may occur.

At step 510, the furnace controller 102 compares the temperature difference to a temperature rise threshold 146 to determine whether the temperature difference is greater than the temperature rise threshold 146. The temperature rise threshold 146 is a temperature difference threshold that indicates when stratification may occur. For example, stratification may occur when the temperature difference is greater than the temperature rise threshold 146. At step 512, the furnace controller 102 determines that the conditions for stratification have been satisfied and that stratification is occurring or may occur and proceeds to step 514 when the temperature difference is greater than the temperature rise threshold 146. Otherwise, the furnace controller 102 returns to step 502 when the temperature difference is less than the temperature rise threshold 146. The furnace controller 102 determines that the conditions for stratification have not been satisfied.

At step 514, the furnace controller 102 transitions the ACF 120 from the first speed to a second speed to achieve a second temperature rise that is less than the first temperature rise. The furnace controller 102 may transmit one or more electrical signal to transition the ACF 120 from the first speed to the second speed. The second speed is greater than the first speed, which reduces the heat output or the supply air temperature of the heating system 100. Reducing the supply air temperature of the heating system 100 reduces the temperature difference between the return air temperature and the room air temperature or the temperature difference between the supply air temperature and the return air temperature, which helps reduce or eliminate stratification in the room 158. The furnace controller 102 may determine the second speed using a temperature map 144 that maps temperatures or temperature rises to speed of the ACF 120. For example, the furnace controller 102 may use a temperature map 144 similar to Table 1 or Table 4.

In one embodiment, the temperature map 144 may also map temperatures or temperature rises to configurations for the heating unit 122. For example, the temperature map 144 may be similar to Table 4. In such an embodiment, the furnace controller 102 may determine a second configuration for the heating unit 122 when the temperature difference is greater than the temperature rise threshold 146. The furnace controller 102 may transition the heating unit 122 from the first configuration to the second configuration in response to determining the second configuration. For example, the furnace controller 102 may transition the heating unit 122 from the first configuration to the second configuration in addition to adjusting the speed of the ACF 120 or as an alternative to adjusting the speed of the ACF 120. The furnace controller 102 may transmit one or more electrical signal to transition the heating unit 122 from the first configuration to the second configuration. Transitioning the heating unit 122 from the first configuration to the second configuration to provide less heat and to achieve the second temperature rise may be similar to as described in FIG. 4 and may comprise switching from the first set of active burners to a second set of active burners that comprises less burners 118 than the first set of active burners or decreasing the speed of the CAB 106 and the pressure to a gas valve operably coupled to the first set of active burners to transition the first set of active burners from a high-fire mode to a low-fire mode. Transitioning the heating unit 122 to the second configuration reduces the supply air temperature of the heating system 100, which reduces the temperature difference between the return air temperature and the room air temperature or the temperature difference between the supply air temperature and the return air temperature, which helps reduce or eliminate stratification in the room 158.

Figure 6:
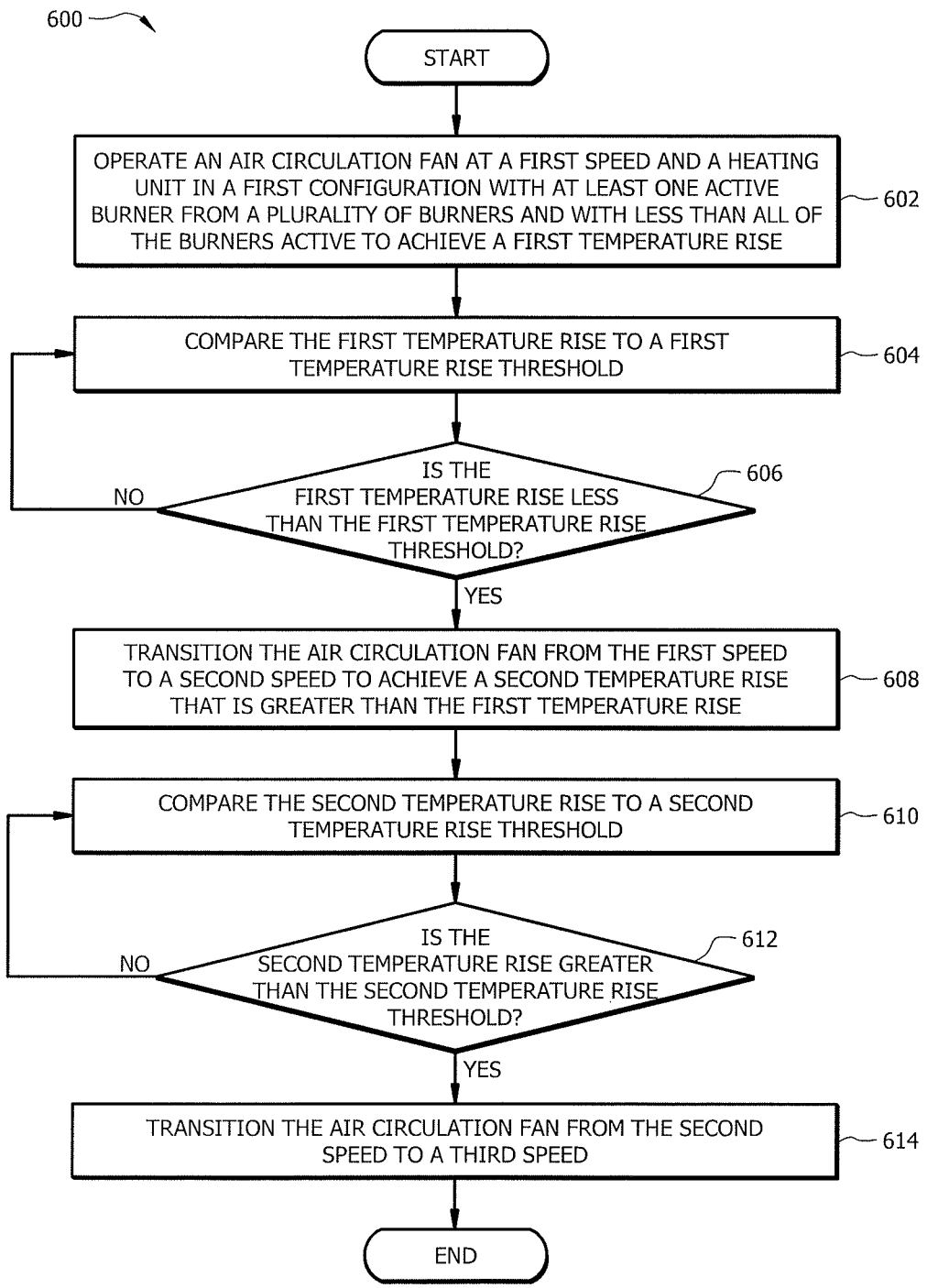
FIG. 6 is a flowchart of an embodiment of a heating control method for operating a heating system in an energy saving mode.

FIG. 6 is a flowchart of an embodiment of a heating control method 600 for operating a heating system 100 in an energy saving mode. In an energy saving mode, the heating system 100 delivers a reduced temperature increase and allows the ACF 120 to gradually heat up a room over a longer period of time. The heating system 100 is configured to transition to the ACF 120 to a lower speed when additional heat is required and then to transition the ACF 120 to a higher speed when the additional heat is no longer required. Method 600 is implemented by furnace controller 102 to operate the ACF 120 to gradually heat up an area over a longer period of time.

At step 602, the furnace controller 102 operates the ACF 120 at a first speed and the heating unit 122 in a first configuration with at least one active burner 118 from a plurality of burners 118 and with less than all of the burners 118 active to achieve a first temperature. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The heating system may be in a low-energy mode when the furnace controller 102 operates the ACF 120 at the first speed and the heating unit 122 in the first configuration. The furnace controller 102 may transmit one or more electrical signal to operate the ACF 120 in the first speed and the heating unit 122 in the first configuration.

At step 604, the furnace controller 102 compares the first temperature rise to a first temperature rise threshold 146. The furnace controller 102 may use the DAS 128, the return air sensor 138, and/or the room air temperature sensor 136 to measure and determine the first temperature rise. The furnace controller 102 may then compare the first temperature rise to the first temperature rise threshold 146 to determine whether the first temperature rise is less than the first temperature rise threshold 146. The first temperature rise threshold 146 may correspond with a lower limit for desired temperature rise or temperature rise range for a room 158. The furnace controller 102 compares the first temperature rise and the first temperature rise threshold 146 to determine whether the current temperature rise (i.e. the first temperature rise) meets or exceeds the lower limit (i.e. the first temperature rise threshold 146) for the desired temperature rise for the room 158. At step 606, the furnace controller 102 determines that the current temperature rise does not meet or exceed the lower limit for the desired temperature rise for the room 158 and proceeds to step 608 when the first temperature rise is less than the first temperature rise threshold 146. Otherwise, the furnace controller 102 determines that the current temperature rise meets or exceeds the desired temperature rise for the room 158 and returns to step 604 when the first temperature rise is greater than the first temperature rise threshold 146.

At step 608, the furnace controller 102 transitions the ACF 120 from the first speed to a second speed to achieve a second temperature rise. The furnace controller 102 may transmit one or more electrical signal to transition the ACF 120 from the first speed to the second speed. The second temperature rise is greater than the first temperature rise. The second speed is less than the first speed, which increases the heat output and the supply air temperature of the heating system 100. The increase in the supply air temperature leads to an increase in the temperature rise of the room 158. The furnace controller 102 may determine the second speed using a temperature map 144. For example, the furnace controller 102 may use a temperature map 144 similar to Table 1 or Table 4. At step 610, the furnace controller 102 compares the second temperature rise to a second temperature rise threshold 146 to determine whether the second temperature rise is greater than the second temperature rise threshold 146. The second temperature rise threshold 146 may correspond with an upper limit for the desired temperature rise or temperature rise range for the room 158. The furnace controller 102 compares the second temperature rise and the second temperature rise threshold 146 to determine whether the new current temperature rise (i.e. the second temperature rise) meets or exceeds the upper limit (i.e. the second temperature rise threshold 146) for the desired temperature rise for the room 158. At step 612, the furnace controller 102 determines that the new current temperature rise meets or exceeds the upper limit for the desired temperature rise for the room 158 and proceeds to step 614 when the second temperature rise is greater than the second temperature rise threshold 146. Otherwise, the furnace controller 102 determines that the new current temperature rise does not meet or exceed the upper limit for the desired temperature rise of the room 158 and returns to step 610 when the second temperature rise is less than the second temperature rise threshold 146.

At step 614, the furnace controller 102 transitions the ACF 120 from the second speed to a third speed to achieve a third temperature rise that is less than the second temperature rise. The furnace controller 102 may transmit one or more electrical signal to transition the ACF 120 from the second speed to the third speed. The third speed is greater than second speed, which reduces the heat output and the supply air temperature of the heating system 100. The reduction in the supply air temperature leads to a decrease in the temperature rise of the room 158. The third speed may be the same as or different than the first speed. For example, the third speed may be equal to the first speed to return the heating system 100 to a low-energy mode. The furnace controller 102 may determine the third speed using a temperature map 144. For example, the furnace controller 102 may use a temperature map 144 similar to Table 1 or Table 4.

In one embodiment, the furnace controller 102 may transition the heating unit 122 from the first configuration to the second configuration in response to adjust the temperature rise. For example, the furnace controller 102 may transition the heating unit 122 from the first configuration to the second configuration in addition to adjusting the speed of the ACF 120 or as an alternative to adjusting the speed of the ACF 120. The furnace controller 102 may use a temperature map 144 to determine the second configuration based on the desired temperature rise. For example, the temperature map 144 may be similar to Table 4. The furnace controller 102 may transmit one or more electrical signal to transition the heating unit 122 from the first configuration to the second configuration. Transitioning the heating unit 122 from the first configuration to the second to provide more heat and to increase the temperature rise may be similar to as described in FIG. 4 and may comprise switching from the first set of active burners to a second set of active burners that comprises more burners 118 than the first set of active burners, activating a second set of burners, or increasing the speed of the CAB 106 and the pressure to a gas valve operably coupled to the first set of active burners to transition the first set of active burners from a low-fire mode to a high-fire mode. Transitioning the heating unit 122 from the first configuration to the second configuration to provide less heat and to reduce the temperature rise may be similar to as described in FIG. 4 and may comprise switching from the first set of active burners to a second set of active burners that comprises less burners 118 than the first set of active burners or decreasing the speed of the CAB 106 and the pressure to a gas valve operably coupled to the first set of active burners to transition the first set of active burners from a high-fire mode to a low-fire mode.

Figure 7:
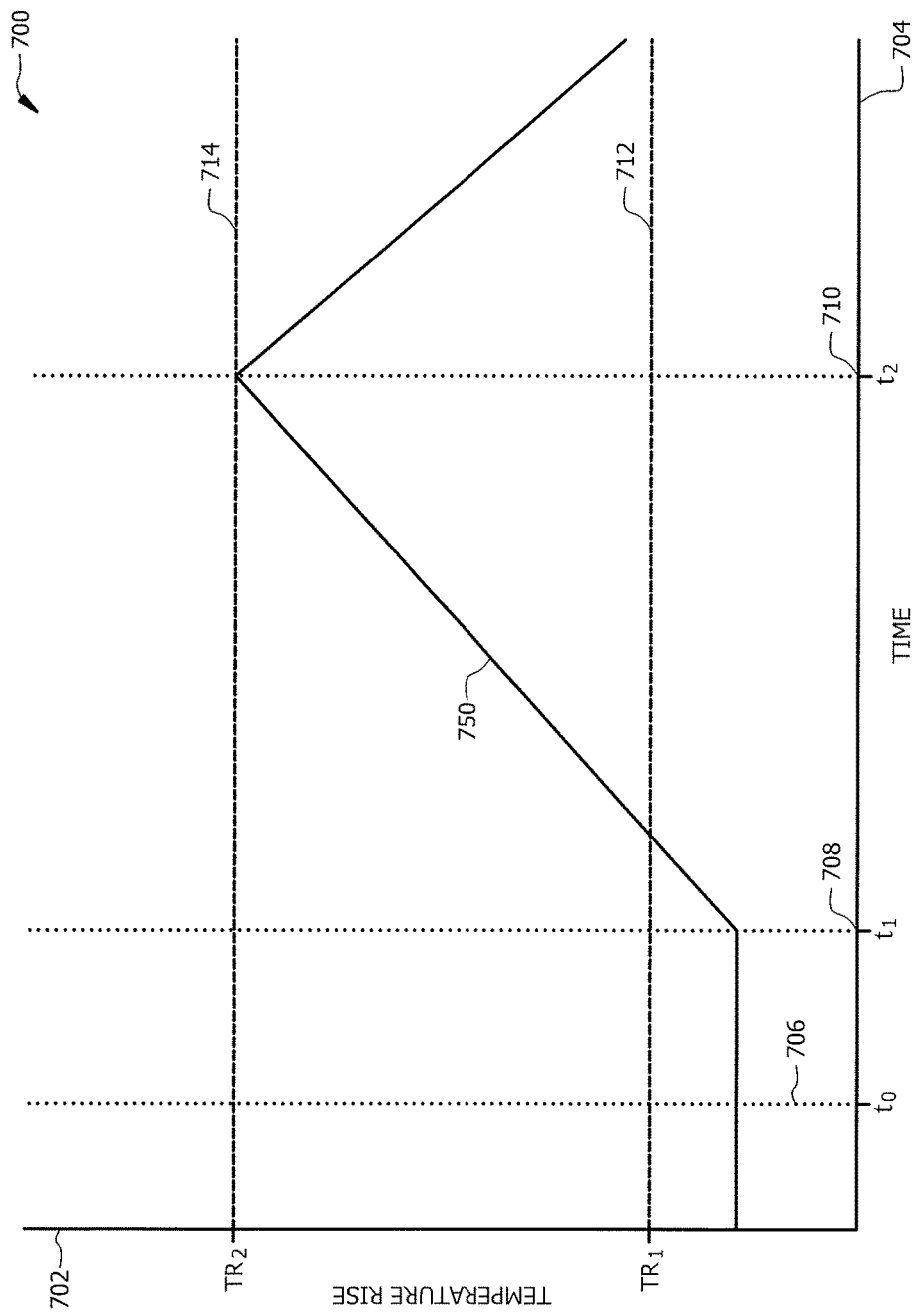
FIG. 7 is a graph of an embodiment of operating a heating system in an energy saving mode.

FIG. 7 is a graph 700 of one embodiment of operating a heating system 100 in an energy saving mode, such as by using method 600 in FIG. 6. Axis 704 indicates time, for example, in seconds or minutes, and axis 702 indicates a temperature rise, for example, in degrees Celsius or Fahrenheit. Line 750 represents the temperature rise over time. At a time $t_0$ 706, the heating system 100 is operating in a low-energy mode and produces a first temperature rise. The furnace controller 102 compares the current temperature rise (i.e. the first temperature rise) to a first temperature rise threshold 712 (e.g. temperature rise threshold 146) to determine whether the current temperature rise meets or exceeds a lower limit (i.e. the first temperature rise threshold 712) for a desired temperature rise range. At time $t_1$ 708, the furnace controller 102 determines that the first temperature rise is less than the first temperature rise threshold 712. The furnace controller 102 may adjust the speed of the ACF 120 and/or the configuration of the heating unit 122 to achieve a second temperature rise that is greater than the first temperature rise. At time $t_2$ 710, the furnace controller 102 compares the new current temperature rise (i.e. the second temperature rise) to a second temperature rise threshold 714 (e.g. temperature rise threshold 146) to determine whether the new current temperature rise meets or exceeds an upper limit (i.e. the second temperature rise threshold 714) for the desired temperature rise range. The furnace controller 102 determines that the second temperature rise is greater than or equal to the second temperature rise threshold 714. The furnace controller 102 may adjust the speed of the ACF 120 and/or the configuration of the heating unit 122 to achieve a third temperature rise that is less than the second temperature rise.

Figure 8:
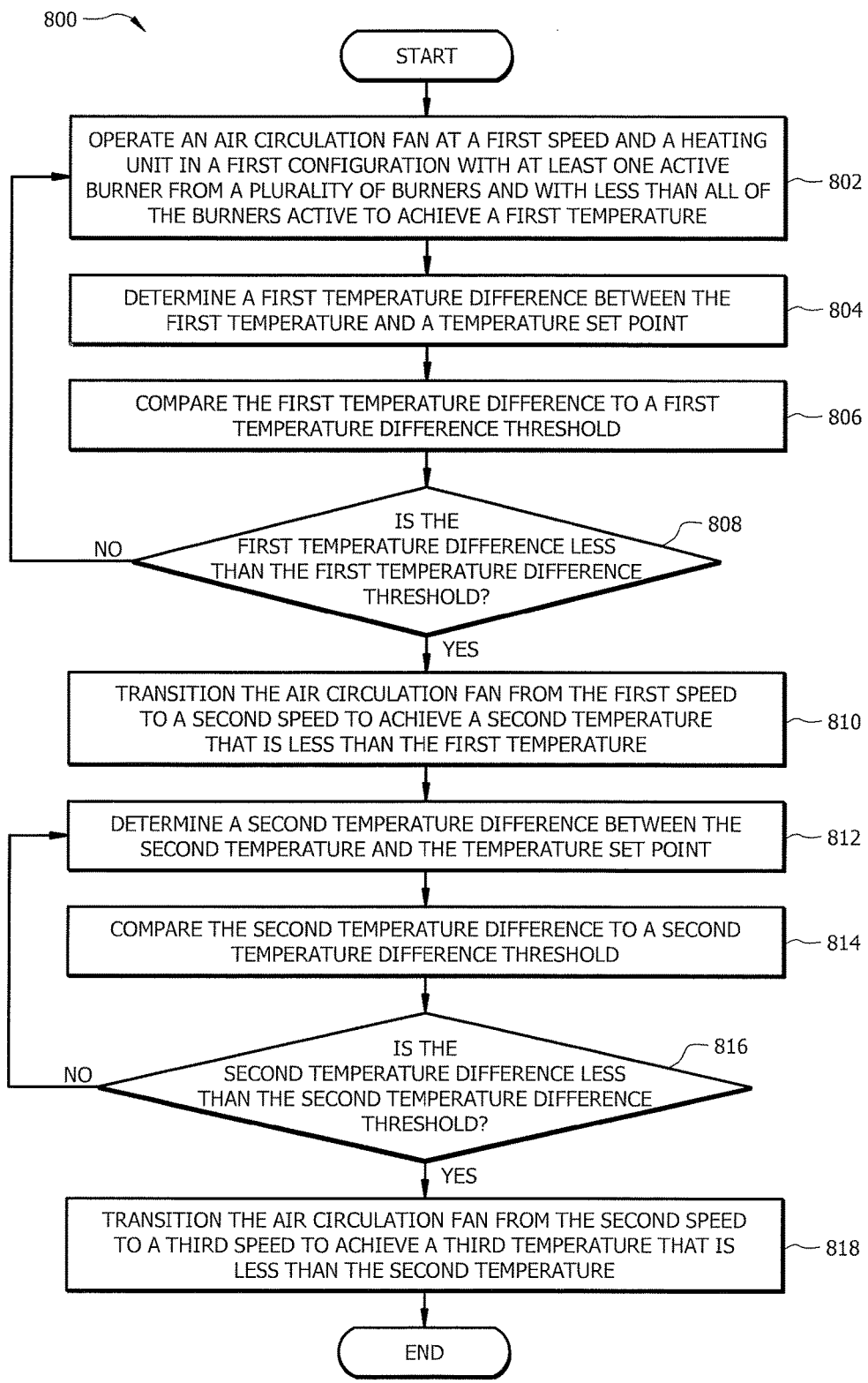
FIG. 8 is a flowchart of an embodiment of a heating control method for operating a heating system in a rapid response heat control mode.

FIG. 8 is a flowchart of an embodiment of a heating control method 800 for operating a heating system 100 in a rapid response heat control mode. In the rapid response mode, the heating system 100 quickly heats up a room 158 without overshooting a temperature set point. Method 800 is implemented by furnace controller 102 to monitor and adjust discharge air temperature as the heating system rapidly provides heat to reach a target temperature set point without overheating and exceeding the temperature set point.

At step 802, the furnace controller 102 operates the ACF 120 at a first speed and the heating unit 122 in a first configuration with at least one active burner 118 from a plurality of burners 118 and with less than all of the burners 118 active to achieve a first temperature. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. Operating the ACF 120 at the first speed and the heating unit 122 in the first configuration provides heat to the space or room 158. The furnace controller 102 may transmit one or more electrical signal to operate the ACF 120 in the first speed and the heating unit 122 in the first configuration.

At step 804, the furnace controller 102 determines a first temperature difference between the first temperature and a temperature set point. The furnace controller 102 may obtain the temperature set point from the thermostat 132. The first temperature difference indicates how close the current temperature (i.e. the first temperature) is to the temperature set point. At step 806, the furnace controller 102 compares the first temperature difference to a first temperature difference threshold 152 to determine whether the first temperature difference is less than the first temperature difference threshold 152. The first temperature difference threshold 152 is a predetermined threshold that is used to determine whether the current temperature is within a first predetermined range of the temperature set point. The furnace controller 102 compares the first temperature difference to the first temperature difference threshold 152 to determine whether the current temperature is within the first predetermined range of the temperature set point. At step 808, the furnace controller 102 determines that the current temperature is within the first predetermined range of the temperature set point and proceeds to step 810 when the first temperature difference is less than the first temperature difference threshold 152. Otherwise, the furnace controller 102 determines that the current temperature is not within the first predetermined range of the temperature set point and returns to step 802 when the first temperature difference is greater than the first temperature difference threshold 152.

At step 810, the furnace controller 102 transitions the ACF 120 from the first speed to a second speed to achieve a second temperature that is less than the first temperature. The furnace controller 102 may transmit one or more electrical signal to transition the ACF 120 from the first speed to the second speed. As the temperature of the room 158 approaches the temperature set point the furnace controller 102 will reduce the amount of heat that is supplied to the room 158 by operating with a lower heat output. The second speed is greater than the first speed, which reduces the heat output and the supply air temperature of the heating system 100. Operating the ACF 120 in the second speed provides less heat to the room than operating the ACF 120 at the first speed. The furnace controller 102 may determine the second speed using a temperature map 144. For example, the temperature map 144 may be similar to Table 1 or Table 4. At step 812, the furnace controller 102 determines a second temperature difference between the second temperature and the temperature set point.

At step 814, the furnace controller 102 compares the second temperature difference to a second temperature difference threshold 152 to determine whether the second temperature difference is less than the second temperature difference threshold 152. The second temperature difference threshold 152 is another predefined threshold that is used to determine whether the current temperature is within a second predetermined range of the temperature set point. The furnace controller 102 compares the second temperature difference to the second temperature difference threshold 152 to determine whether the current temperature is within the second predefined range of the temperature set point. At step 816, the furnace controller 102 determines that the current temperature is within the second predetermined range of the temperature set point and proceeds to step 818 when the second temperature difference is less than the second temperature difference threshold 152. Otherwise, the furnace controller 102 determines that current temperature is not within the second predetermined range of the temperature set point and returns to step 812 when the second temperature difference is greater than the second temperature difference threshold 152.

At step 818, the furnace controller 102 transitions the ACF 120 from the second speed to a third speed to achieve a third temperature that is less than the second temperature. The furnace controller 102 may transmit one or more electrical signal to transition the ACF 120 from the second speed to the third speed. As the temperature of the room 158 approaches the temperature set point the furnace controller 102 will further reduce the amount of heat that is supplied to the room 158 by operating with an even lower heat output. The third speed is greater than the second speed, which further reduces the heat output and the supply air temperature of the heating system 100. Operating the ACF 120 in the third speed provides less heat to the room than operating the ACF 120 at the second speed. The furnace controller 102 may determine the third speed using a temperature map 144. For example, the temperature map 144 may be similar to Table 1 or Table 4. In an embodiment, the furnace controller 102 may determine a temperature difference, compare the temperature difference to a temperature difference threshold 152, and adjust the speed of the ACF 120 as many times as necessary to gradually reduce the heat output and supply air temperature of the heating system 100 as the room temperature approaches the temperature set point without overshooting the temperature set point.

In one embodiment, the furnace controller 102 may transition the heating unit 122 from the first configuration to the second configuration in response to adjust the temperature. For example, the furnace controller 102 may transition the heating unit 122 from the first configuration to the second configuration in addition to adjusting the speed of the ACF 120 or as an alternative to adjusting the speed of the ACF 120. The furnace controller 102 may transmit one or more electrical signal to transition the heating unit 122 from the first configuration to the second configuration. Transitioning the heating unit 122 from the first configuration to the second configuration to provide more heat and to increase the temperature may be similar to as described in FIG. 4 and may comprise switching from the first set of active burners to a second set of active burners that comprises more burners 118 than the first set of active burners, activating a second set of burners, or increasing the speed of the CAB 106 and the pressure to a gas valve operably coupled to the first set of active burners to transition the first set of active burners from a low-fire mode to a high-fire mode. Transitioning the heating unit 122 from the first configuration to the second configuration to provide less heat and to reduce the temperature may be similar to as described in FIG. 4 and may comprise switching from the first set of active burners to a second set of active burners that comprises less burners 118 than the first set of active burners or decreasing the speed of the CAB 106 and the pressure to a gas valve operably coupled to the first set of active burners to transition the first set of active burners from a high-fire mode to a low-fire mode.

Figure 9:
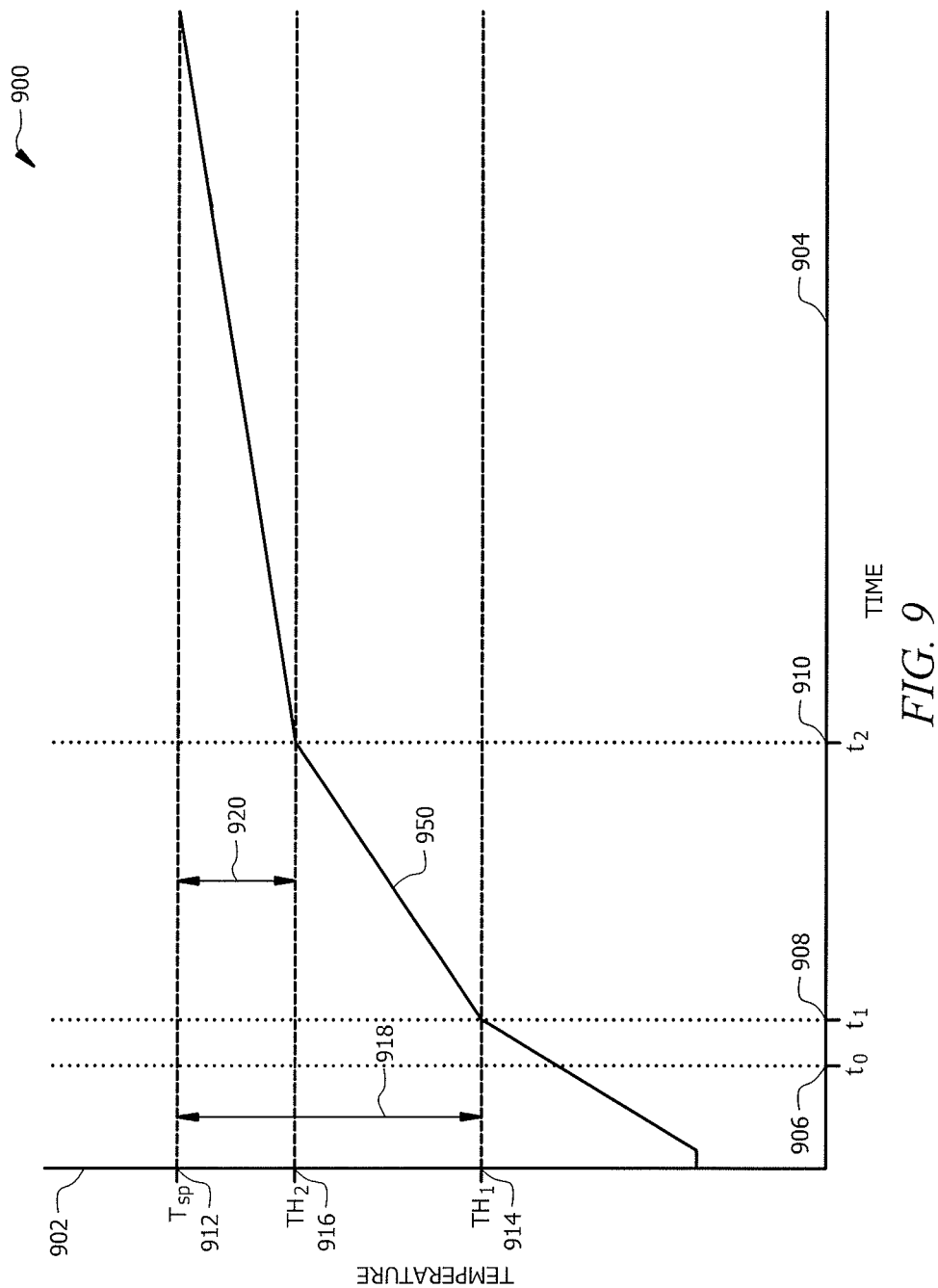
FIG. 9 is a graph of an embodiment of operating a heating system in a rapid response heat control mode.

FIG. 9 is a graph 900 of one embodiment of operating a heating system 100 in a rapid response heat control mode, such as by using method 800 in FIG. 8. Axis 904 indicates time, for example, in seconds or minutes, and axis 902 indicates a temperature, for example, in degrees Celsius or Fahrenheit. Line 950 represents the temperature over time. At a time $t_0$ 906, the heating system 100 produces a first temperature. At time $t_1$ 908, the furnace controller 102 determines a first temperature difference 918 between the current temperature and a temperature set point 912. The furnace controller 102 then compares the first temperature difference 918 to a first temperature difference threshold 914 (e.g. the temperature difference threshold 152) to determine whether the current temperature is within a first predetermined range of the temperature set point 912. The furnace controller 102 determines that current temperature is within the first predetermined range of the temperature set point 912 when the first temperature difference 918 is less than or equal to the first temperature difference threshold 914. The furnace controller 102 may adjust the speed of the ACF 120 and/or the configuration of the heating unit 122 to achieve a second temperature that provides less heat than the first temperature to reduce the heat output and the supply air temperature of the heating system 100. The furnace controller 102 may use a temperature map 144 to adjust the speed of the ACF 120 and/or the configuration of the heating unit 122. At time $t_2$ 910, the furnace controller 102 determines a second temperature difference 920 between the new current temperature and the temperature set point. The furnace controller 102 then compares the second temperature difference 920 to a second temperature difference threshold 916 (e.g. temperature difference threshold 152) to determine whether the new current temperature is within a second predetermined range of the temperature set point 912. The furnace controller 102 determines that the new current temperature is within the second predetermined range of the temperature set point 912 when the second temperature rise is less than or equal to the second temperature difference threshold 916. The furnace controller 102 may adjust the speed of the ACF 120 and/or the configuration of the heating unit 122 to achieve a third temperature that provides less heat than the second temperature and further reduces the heat output and the supply air of the heating system 100.

Figure 10:
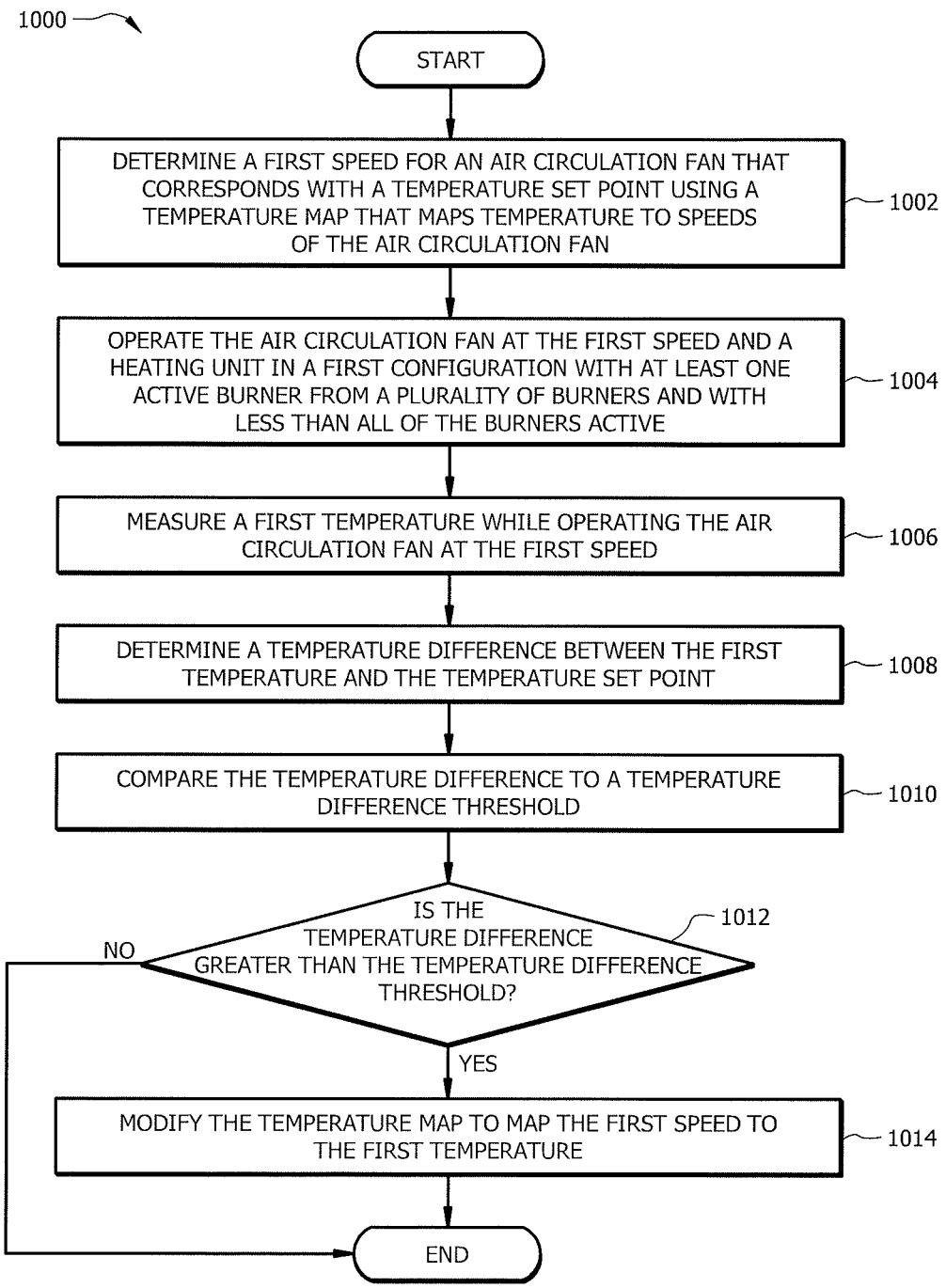
FIG. 10 is a flowchart of an embodiment of a heating control method for operating a heating system in a self-calibration mode.

FIG. 10 is a flowchart of an embodiment of a heating control method 1000 for operating a heating system 100 in a self-calibration mode. In the self-calibration mode, the heating system 100 updates temperature maps 144 for the heating system 100 based on environmental conditions. Method 1000 is implemented by furnace controller 102 to test and modify factory default settings or mappings in a temperature map 144 using information that is acquired from a job site. Method 1000 modifies temperatures in the temperature map 144 when the measured temperature for a given ACF 120 speed is different than an expected temperature set point.

At step 1002, the furnace controller 102 determines a first speed for the ACF 120 that corresponds with a temperature set point (e.g. a desired room temperature or supply air temperature) using a temperature map 144 that maps temperature to speeds of the ACF 120. For example, the furnace controller 102 may use a temperature map 144 similar to Table 1 or Table 4. The furnace controller 102 may use the temperature set point as a key to look up an entry in the temperature map 144 that corresponds with temperature set point to identify the second speed for the ACF 120 from the temperature map 144. At step 1004, the furnace controller 102 operates the ACF 120 at the first speed and the heating unit 122 in a first configuration with at least one active burner 118 from a plurality of burners 118 and with less than all of the burners 118 active. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration.

At step 1006, the furnace controller 102 measures a first temperature while operating the ACF 120 at the first speed. The furnace controller 102 may measure the first temperature using the DAS 128, the return air sensor 138, or the room air temperature sensor 136. At step 1008, the furnace controller 102 determines a temperature difference between the first temperature and the temperature set point. The first temperature difference indicates how far the first temperature that is achieved by the heating system 100 is from the expected temperature set point. At step 1010, the furnace controller 102 compares the temperature difference to a temperature difference threshold 152 to determine whether the temperature difference is greater than the temperature difference threshold 152. The temperature difference threshold 152 may represent a tolerance limit or a temperature range that the temperature set point may vary within. At step 1012, the furnace controller 102 determines that the first temperature is not within the tolerance limits of the temperature set point and proceeds to step 1014 when the temperature difference is greater than the temperature difference threshold 152. When the temperature difference is greater than the temperature difference threshold 152 the default settings or mapping may not be accurate based on environmental conditions for the heating system 100. Otherwise, the furnace controller 102 determines that the first temperature is within the tolerance limits of the temperature set point and terminates method 1000 when the temperature difference is less than the temperature difference threshold 152. At step 1014, the furnace controller 102 modifies the temperature map 144 to map the first speed to the first temperature. The furnace controller 102 modifies the entry in the temperature map 144 with the temperature that is measured (i.e. the first temperature) when the ACF 120 is operating at the first speed. Updating the temperature map 144 provides a more accurate mapping between the speed of the ACF 120 and the output temperature or temperature rise when operating at the first speed based on environmental conditions for the heating system 100.

Figure 11:
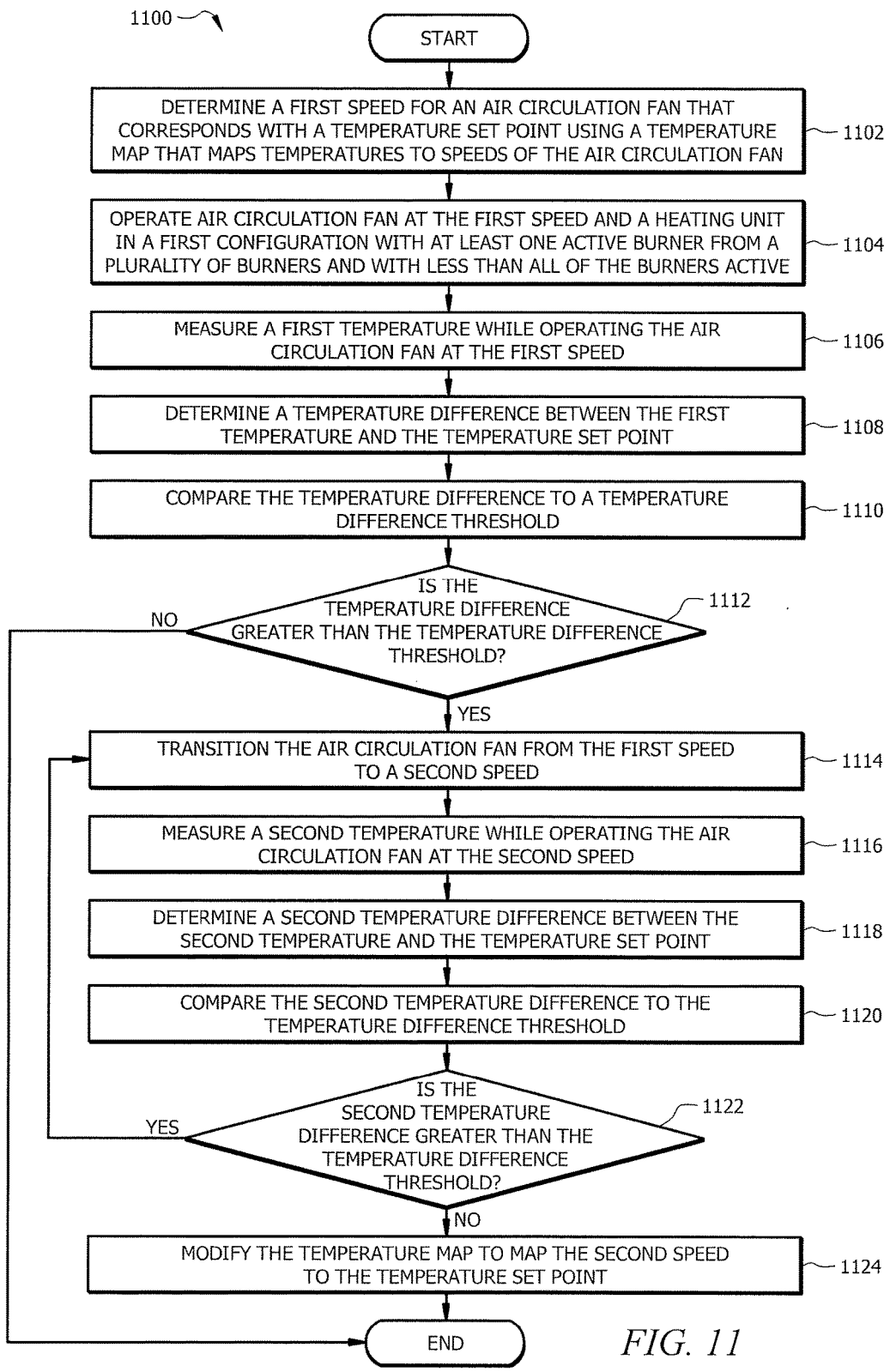
FIG. 11 is a flowchart of another embodiment of a heating control method for operating a heating system in a self-calibration mode.

FIG. 11 is a flowchart of another embodiment of a heating control method 1100 for operating a heating system 100 in a self-calibration mode. Method 1100 is implemented by furnace controller 102 in the heating system 100 to update temperature maps 144 for the heating system 100 based on environmental conditions. In particular, method 1100 is implemented to modify a speed for the ACF 120 in a temperature map 144 that corresponds with a temperature set point.

At step 1102, the furnace controller 102 determines a first speed for the ACF 120 that corresponds with a temperature set point (e.g. a desired room temperature or supply air temperature) using a temperature map 144 that maps temperatures to speeds of the ACF 120. For example, the furnace controller 102 may use a temperature map 144 similar to Table 1 or Table 4. The furnace controller 102 may use the temperature set point as a key to look up an entry that corresponds with the temperature set point to identify the first speed for the ACF 120 from the temperature map 144. At step 1104, the furnace controller 102 operates the ACF 120 at a first speed and the heating unit 122 in a first configuration with at least one active burner 118 from a plurality of burners 118 and with less than all of the burners 118 active. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration.

At step 1106, the furnace controller 102 measures a first temperature while operating the ACF 120 at the first speed. The furnace controller 102 may measure the first temperature using the DAS 128, the return air sensor 138, or the room air temperature sensor 136. At step 1108, the furnace controller 102 determines a temperature difference between the first temperature and the temperature set point. The first temperature difference indicates how far the first temperature that is achieved by the heating system 100 is from the expected temperature set point. At step 1110, the furnace controller 102 compares the temperature difference to a temperature difference threshold 152 to determine whether the temperature difference is greater than the temperature difference threshold 152. The temperature difference threshold 152 may represent a tolerance limit or a temperature range that the temperature set point may vary within. The furnace controller 102 compares the first temperature difference to the temperature difference threshold 152 to determine whether the first temperature is within the tolerance limits of the temperature set point. At step 1112, the furnace controller 102 determines that the first temperature is not within the tolerance limits of the temperature set point and proceeds to step 1114 when the temperature difference is greater than the temperature difference threshold 152. When the temperature difference is greater than the temperature difference threshold 152 the default settings or mapping may not be accurate based on environmental conditions for the heating system 100. For example, extreme environmental conditions may cause the heating system 100 to underperform when using default settings or mappings. Otherwise, the furnace controller 102 determines that the first temperature is within the tolerance limits of the temperature set point and terminates method 1100 when the temperature difference is less than the temperature difference threshold 152.

At step 1114, the furnace controller 102 transitions the ACF 120 from the first speed to a second speed. The furnace controller 102 may transmit one or more electrical signal to transition the ACF 120 from the first speed to the second speed. The furnace controller 102 selects the second speed to adjust the first temperature to a second temperature that is closer to the temperature set point. For example, the furnace controller 102 uses the temperature map 144 to determine the second speed. The second speed may be greater than the first speed to reduce the first temperature to a lower temperature. Alternatively, the second speed may be less than the first speed to increase the first temperature to a higher temperature. At step 1116, the furnace controller 102 measures a second temperature while operating the ACF 120 at the second speed. At step 1118, the furnace controller 102 determines a second temperature difference between the second temperature and the temperature set point. The second temperature difference indicates how far the second temperature is from the temperature set point.

At step 1120, the furnace controller 102 compares the second temperature difference to the temperature difference threshold 152 to determine whether the second temperature difference is less than the temperature difference. The furnace controller 102 compares the second temperature difference to the temperature difference threshold 152 to determine whether the second temperature is within the tolerance limits of the temperature set point. At step 1122, the furnace controller 102 determines that the second temperature is within the tolerance limits of the temperature set point and proceeds to step 1124 when the second temperature difference is less than the temperature difference threshold 152. Otherwise, the furnace controller 102 determines that the second temperature is not within the tolerance limits of the temperature set point and returns to step 1114 to select a different second speed when the second temperature difference is greater than the temperature difference threshold 152. At step 1124, the furnace controller 102 updates the temperature map 144 to map the second speed to the temperature set point. The furnace controller 102 modifies the entry in the temperature map 144 with the second speed that is used to obtain the second temperature that is within the tolerance limits of the temperature set point.

Figure 12:
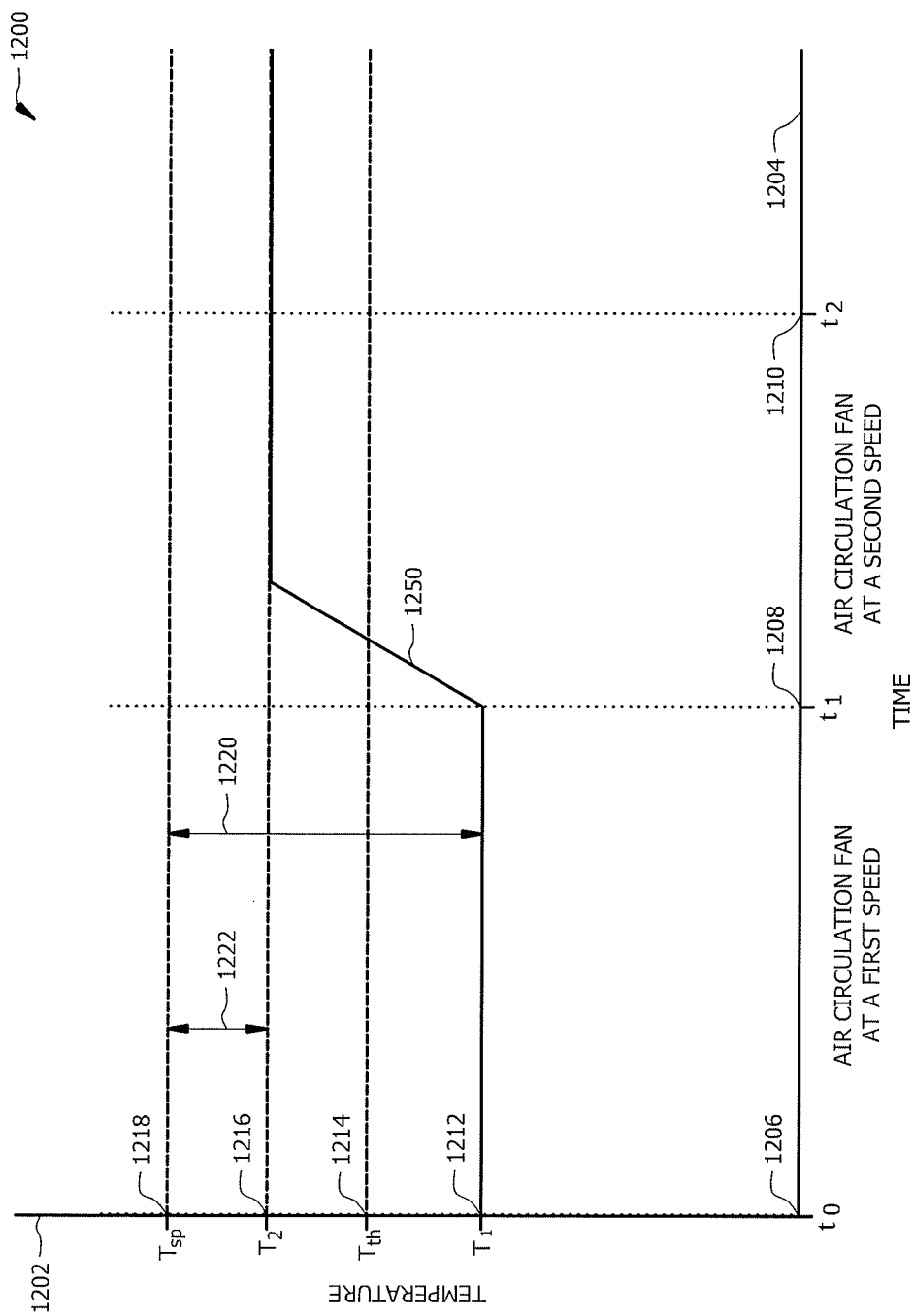
FIG. 12 is a graph of an embodiment of operating a heating system in a self-calibration mode.

FIG. 12 is a graph 1200 of one embodiment of operating a heating system 100 in a self-calibration mode, such as by using method 1000 in FIG. 10 and method 1100 in FIG. 11. Axis 1204 indicates time, for example, in seconds or minutes, and axis 1202 indicates a temperature, for example, in degrees Celsius or Fahrenheit. Line 1250 represents the temperature over time. At a time $t_0$ 1206, the furnace controller 102 determines a first speed for the ACF 120 that corresponds with a temperature set point 1218 using a temperature map 144 that maps temperatures to speeds of the ACF 120. For example, the temperature map 144 may be similar to Table 1 or Table 4. At time $t_1$ 1208, the furnace controller 102 measures a first temperature and determines a first temperature difference 1220 between the first temperature and a temperature set point 1218. The furnace controller 102 compares the first temperature difference 1220 to a temperature difference threshold 1214 (e.g. temperature difference threshold 152) to determine whether the first temperature is within the tolerance limits of the temperature set point. The furnace controller 102 determines that the first temperature is not within the tolerance limits of the temperature set point when the first temperature difference 1220 is greater than the temperature difference threshold 1214. In one embodiment, the furnace controller 102 updates the temperature map 144 to map the first temperature to the first speed of the ACF 120. The furnace controller 102 modifies an entry in the temperature map 144 with the temperature that is measured (i.e. the first temperature) when the ACF 120 is operating at the first speed.

In another embodiment, the furnace controller 102 may adjust the speed of the ACF 120 and/or the configuration of the heating unit 122 to achieve a second temperature that is closer to the temperature set point 1218 in response to determining that the first temperature difference 1220 is greater than the temperature difference threshold 1214. For example, the furnace controller 102 may transition the ACF 120 from a first speed to a second speed. The second speed may be greater than the first speed to reduce the first temperature to a lower temperature. Alternatively, the second speed may be less than the first speed to increase the first temperature to a higher temperature. At time $t_2$ 1210, the furnace controller 102 determines a second temperature difference 1222. The furnace controller 102 compares the second temperature difference 122 to the temperature difference threshold 1214 to determine whether the second temperature is within the tolerance limits of the temperature set point. The furnace controller 102 determines that the second temperature is within the tolerance limits of the temperature set point when the second temperature is less than or equal to the temperature difference threshold 1214. The furnace controller 102 updates the temperature map 144 to map the second speed and/or the configuration of the heating unit 122 to the temperature set point. The furnace controller 102 modifies the entry in the temperature map 144 with the second speed or configuration of the heating unit 122 that is used to obtain the second temperature that is within the tolerance limits of the temperature set point.

Figure 13:
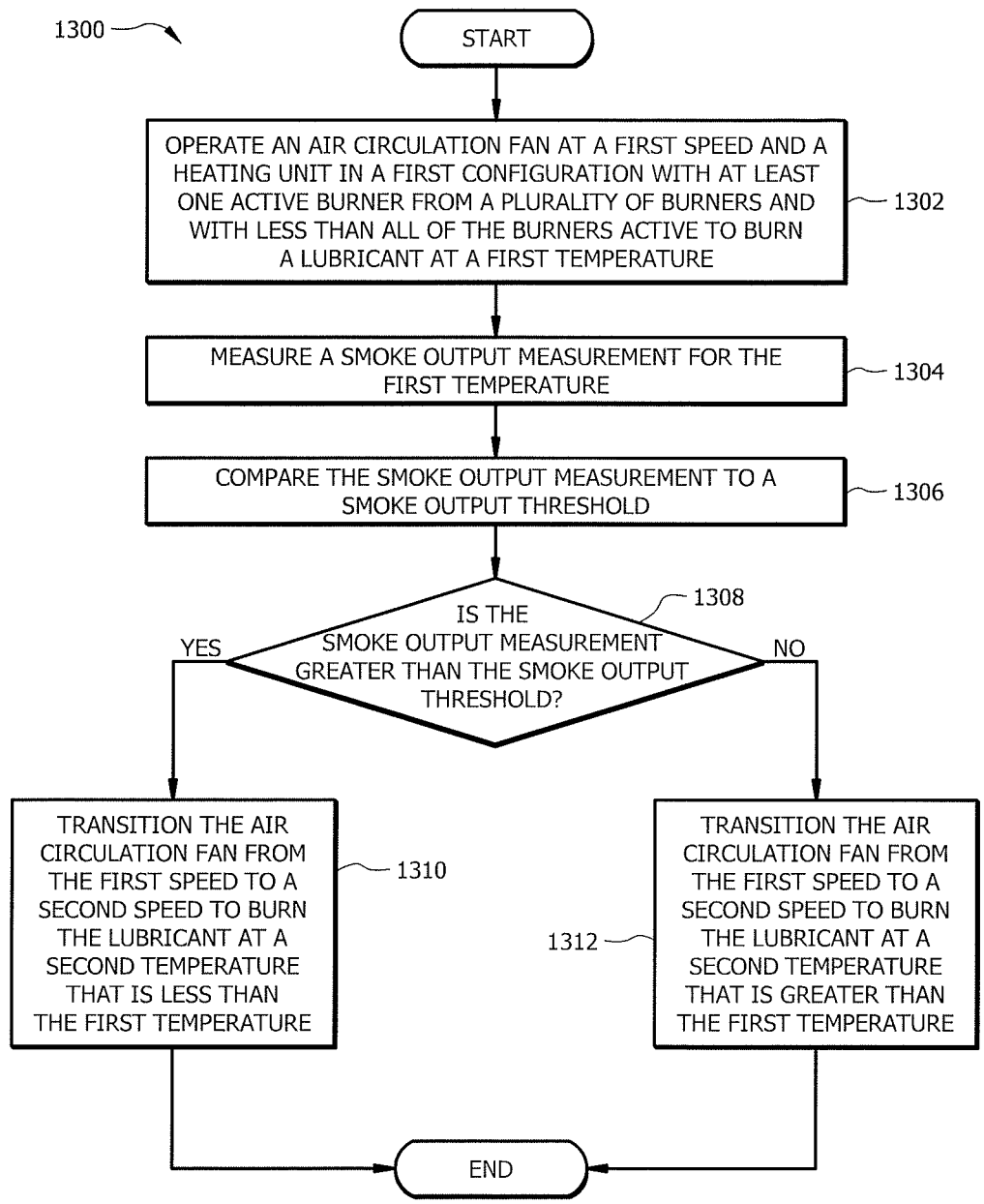
FIG. 13 is a flowchart of an embodiment of a heating control method for operating a heating system in an auto heating commissioning mode.

FIG. 13 is a flowchart of an embodiment of a heating control method 1300 for operating a heating system in an auto heating commissioning mode. Method 1300 is implemented by the furnace controller 102 in the heating system 100 to adjust the speed of the ACF 120 to adjust the temperature that is used for burning lubricants during maintenance to control the smoke output of the heating system 100.

At step 1302, the furnace controller 102 operates the ACF 120 at a first speed and the heating unit 122 in a first configuration with at least one active burner 118 from a plurality of burners 118 and with less than all of the burners 118 active to burn a lubricant at a first temperature. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration.

At step 1304, the furnace controller 102 measures a smoke output measurement for the first temperature, for example, using the smoke sensor 162. At step 1306, the furnace controller 102 compares the smoke output measurement to a smoke output measurement threshold 150. The smoke output threshold 150 may be a predetermined threshold that indicates the maximum amount of smoke output that is allowed. For example, the smoke output of the heating system 100 may be limited by the smoke output threshold 150 for safety reasons. The furnace controller 102 compares the smoke output measurement to the smoke output threshold 150 to determine whether the smoke output measurement is greater than the smoke output threshold 150. In other words, the furnace controller 102 determines whether too much smoke is being generated at the current operating temperature. At step 1308, the furnace controller 102 determines that too much smoke is being generated and proceeds to step 1310 when the smoke output measurement is greater than the smoke output threshold 150. Otherwise, the furnace controller 102 determines that too much smoke is not being generated and proceeds to step 1312 when the smoke output measurement is less than the smoke output threshold 150.

At step 1310, the furnace controller 102 transitions the ACF 120 from the first speed to a second speed to burn the lubricant at a second temperature that is less than the first temperature. The furnace controller 102 may transmit one or more electrical signal to transition the ACF 120 from the first speed to the second speed. The second speed is greater than the first speed, which reduces the heat output of the heating system 100 and allows the lubricant to be burned at a lower temperature. Reducing the temperature from the first temperature to the second temperature reduces the amount of smoke that is generated and the smoke output measurement. The furnace controller 102 may determine the second speed using a temperature map 144. For example, the temperature map 144 may be similar to Table 1 or Table 4.

Returning to step 1308, the furnace controller 102 proceeds to step 1312 when the smoke output measurement is less than the smoke output threshold 150. At step 1312, the furnace controller 102 transitions the ACF 120 from the first speed to a second speed to burn the lubricant at a second temperature that is greater than the first temperature. The furnace controller 102 may transmit one or more electrical signal to transition the ACF 120 from the first speed to the second speed. The second speed is less than the first speed, which increases the heat output of the heating system 100 and allows the lubricant to be burned at a higher temperature. The furnace controller 102 may burn the lubricant at a higher temperature to increase efficiency or reduce the time required to burn the lubricant.

Figure 14:
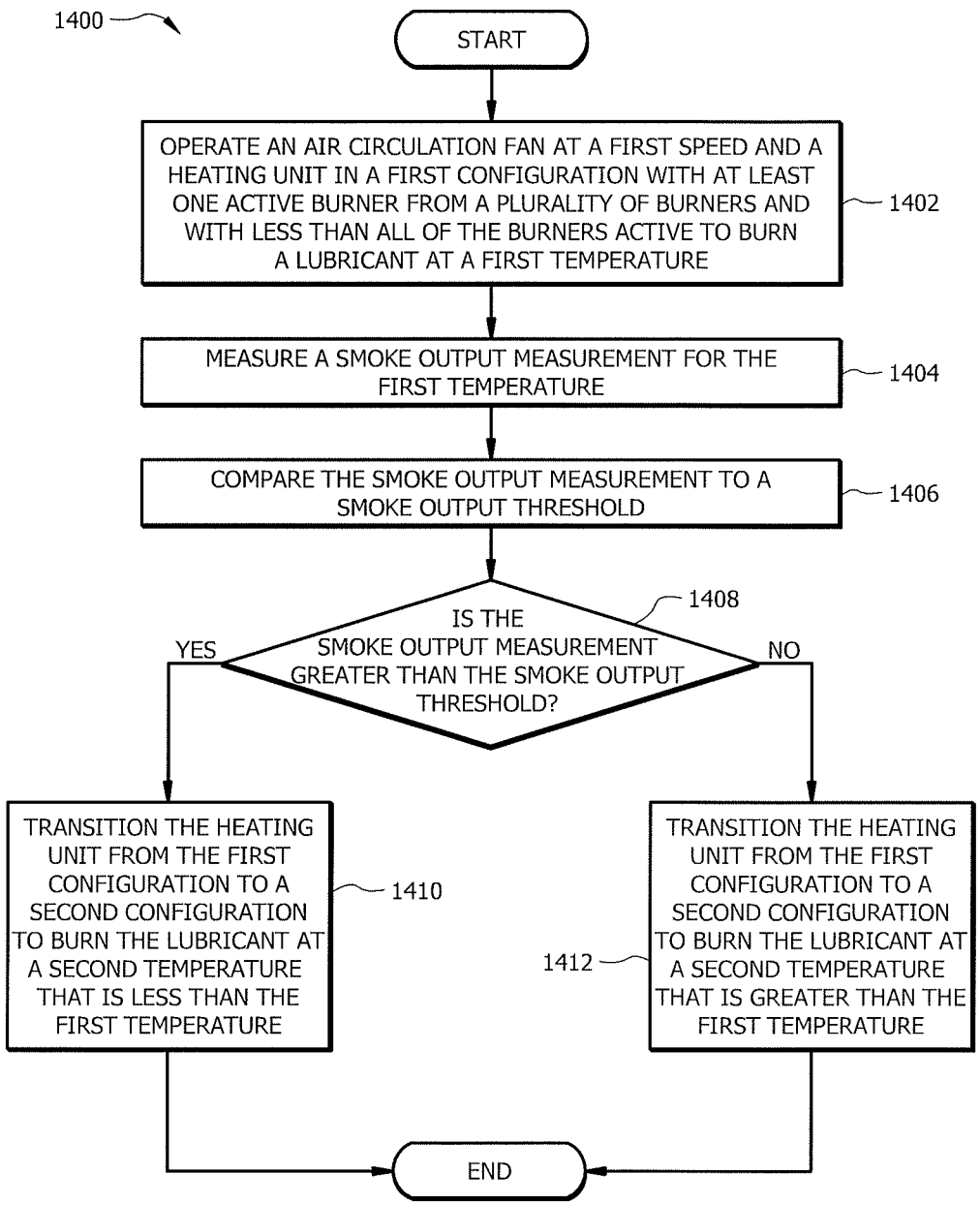
FIG. 14 is a flowchart of another embodiment of a heating control method for operating a heating system in an auto heating commissioning mode.

FIG. 14 is a flowchart of another embodiment of a heating control method 1400 for operating a heating system 100 in an auto heating commissioning mode. Method 1400 is implemented by the furnace controller 102 in the heating system 100 to adjust the configuration of the heating unit 122 to adjust the temperature that is used for burning lubricants during maintenance to control the smoke output of the heating system 100.

At step 1402, the furnace controller 102 operates the ACF 120 at a first speed and the heating unit 122 in a first configuration with at least one active burner from a plurality of burners and with less than all of the burners active to burn a lubricant at a first temperature. For example, the heating unit 122 may be configured such that a first set of burners (e.g. the first set of burners 114) in a first segment of the gas manifold 160 is active and a second set of burners (e.g. the second set of burners 116) in a second segment of the gas manifold 160 is inactive. The active burners 118 may operate in either the low-fire mode or the high-fire mode. The furnace controller 102 may transmit one or more electrical signal to operate the ACF 120 in the first speed and the heating unit 122 in the first configuration.

At step 1404, the furnace controller 102 measure a smoke output measurement for the first temperature, for example, using smoke sensor 162. At step 1406, the furnace controller 102 compares the smoke output measurement to a smoke output threshold 150. The smoke output threshold 150 is similar to as described in FIG. 13. The furnace controller 102 compares the smoke output measurement to the smoke output threshold 150 to determine whether the smoke output measurement is greater than the smoke output threshold 150. The furnace controller 102 determines whether too much smoke is being generated at the current operating temperature. At step 1408, the furnace controller 102 determines that too much smoke is being generated and proceeds to step 1410 when the smoke output measurement is greater than the smoke output threshold 150. Otherwise, the furnace controller 102 determines that too smoke is not being generated and proceeds to step 1412 when the smoke output measurement is less than the smoke output threshold 150.

At step 1410, the furnace controller 102 transitions the heating unit 122 from the first configuration to a second configuration to burn the lubricant at a second temperature that is less than the first temperature. The furnace controller 102 may transmit one or more electrical signal to transition the heating unit 122 from the first configuration to the second configuration. The furnace controller 102 may transition the heating unit 122 from the first configuration to the second configuration to provide less heat and to reduce the temperature similar to as described in FIG. 4. Transitioning the heating unit 122 to the second configuration to provide less heat may comprise switching from the first set of active burners to a second set of active burners that comprises less burners 118 than the first set of active burners or decreasing the speed of the CAB 106 and the pressure to a gas valve operably coupled to the first set of active burners to transition the first set of active burners from a high-fire mode to a low-fire mode. The furnace controller 102 may determine the second configuration using a temperature map 144. For example, the temperature map 144 may be similar to Table 2, Table 3, or Table 4.

Returning to step 1408, the furnace controller 102 proceeds to step 1412 when the smoke output measurement is less than the smoke output threshold 150. At step 1412, the furnace controller 102 transitions the heating unit 122 from the first configuration to a second configuration to burn the lubricant at a second temperature that is greater than the first temperature. The furnace controller 102 may transmit one or more electrical signal to transition the heating unit 122 from the first configuration to the second configuration. The furnace controller 102 may transition the heating unit 122 from the first configuration to the second configuration to provide more heat and to increase the temperature similar to as described in FIG. 4. Transitioning the heating unit 122 to the second configuration to provide more heat may comprise switching from the first set of active burners to a second set of active burners that comprises more burners 118 than the first set of active burners, activating a second set of burners, or increasing the speed of the CAB 106 and the pressure to a gas valve operably coupled to the first set of active burners to transition the first set of active burners from a low-fire mode to a high-fire mode.

Figure 15:
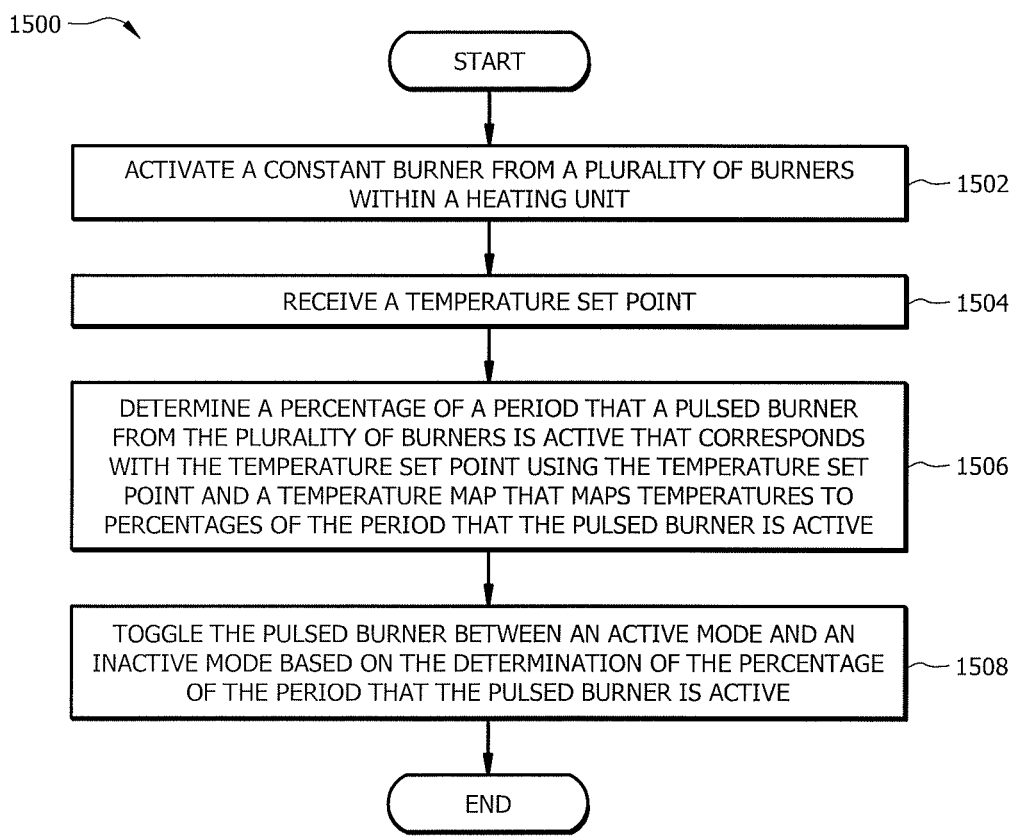
FIG. 15 is a flowchart of an embodiment of a heating control method for operating a heating system in a gas pulse modulation temperature control mode.

FIG. 15 is a flowchart of an embodiment of a heating control method 1500 for operating a heating system 100 in a gas pulse modulation temperature control mode. Method 1500 is implemented by the furnace controller 102 in the heating system 100 to adjust a discharge air temperature or temperature rise using pulse width modulation with a pulsed burner 118. The heating unit 122 may be configured with a constant burner 118 and a pulsed burner 118 similarly to as described in FIG. 3.

At step 1502, the furnace controller 102 activates a constant burner 118 from a plurality of burners 118 within the heating unit 122. For example, the heating unit 122 may be configured such that a first burner 118 or set of burners (e.g. the first set of burners 114) in a first segment of the gas manifold 160 are configured as constant burners and a second burner 118 or set of burners (e.g. the second set of burners 116) in a second segment of the gas manifold 160 are configured as pulsed burners 118. The constant burner 118 is configured to remain active during operation. The pulsed burners 118 are configured to toggle between an active mode and an inactive mode. The furnace controller 102 may transmit one or more electrical signal to activate the constant burner 118.

At step 1504, the furnace controller 102 receives a temperature set point (e.g. a desired room temperature or supply air temperature), for example, from the thermostat 132. At step 1506, the furnace controller 102 determines a percentage of a time period that a pulsed burner 118 from the plurality of burners 118 is active using the temperature set point and a temperature map 144 that maps temperatures to percentages of the time period that the pulsed burner 118 is active. For example, the temperature map 144 may be similar to Table 5. The furnace controller 102 may use the temperature set point as a key to look up an entry in the temperature map 144 to identify the percentage of the time period that the pulsed burner 118 is active (e.g. a duty cycle) that corresponds with the temperature set point from the temperature map 144. At step 1508, the furnace controller 102 toggles the pulsed burner 118 between the active mode and the inactive mode based on the determination of the percentage of the time period that the pulsed burner 118 is active. The furnace controller 102 may transmit one or more electrical signal to toggle the pulsed burner 118. The percentage of the time period that the pulsed burner 188 is active controls how long the pulsed burner 118 stays in the active mode before toggling to the inactive mode.

When the furnace controller 102 receives another temperature set point, the furnace controller 102 may repeat step 1506 and 1508 to determine another percentage of the time period that the pulsed burner 118 is active and to toggle the pulsed burner 118 based on the percentage of the time period that the pulsed burner 118 is active. For example, the furnace controller 102 may receive a new temperature set point that is a higher temperature than the original temperature set point. The furnace controller 102 may use the temperature map 144 to identify a higher percentage of the time period that the pulsed burner 118 is active (i.e. a higher duty cycle) to provide more heat to achieve the new temperature set point. Alternatively, the furnace controller 102 may receive a new temperature set point that is a lower temperature than the original temperature set point. The furnace controller 102 may use the temperature map 144 to identify a lower percentage of the time period that the pulsed burner 118 is active (i.e. a lower duty cycle) to provide less heat to achieve the new temperature set point.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. §112(f) as it exists on the date of filing hereof unless the words "means for" or "step for" are explicitly used in the particular claim.

The invention claimed is:

1. A heating control system comprising:
an air circulation fan configurable to operate at a plurality of speeds;
a heating unit operably coupled to the air circulation fan, wherein the heating unit comprises a plurality of burners, and wherein the heating unit is configurable to operate with less than all of the burners active;
a return air temperature sensor configured to measure a return air temperature;
a room air temperature sensor configured to measure a room air temperature;
a memory operable to store a plurality of temperature rise thresholds;
a microprocessor operably coupled to the air circulation fan, the heating unit, the supply air temperature sensor, the room air temperature sensor, and the memory, and configured to:
transmit a first electrical signal to operate the air circulation fan at a first speed and the heating unit in a first configuration with at least one active burner from the plurality of burners to achieve a first temperature rise, wherein less than all of the burners are active when the heating unit is in the first configuration;
obtain the return air temperature from the return air temperature sensor;
obtain the room air temperature from the room air temperature sensor;
determine a temperature difference between the return air temperature and the room air temperature;
compare the temperature difference to a temperature rise threshold; and
transmit a second electrical signal to transition the air circulation fan from the first speed to a second speed to achieve a second temperature rise when the temperature difference is greater than the temperature rise threshold, wherein the second speed is greater than the first speed, and wherein the second temperature rise is less than the first temperature rise.

2. The system of claim 1, wherein operating the heating unit in the first configuration comprises:
activating the at least one active burner using a first segment of a gas manifold; and
deactivating at least one burner using a second segment of the gas manifold, wherein gas communication between the first segment and the second segment is disallowed.

3. The system of claim 1, wherein operating the heating unit in the first configuration comprises:
activating the at least one active burner using a first gas valve; and
deactivating at least one burner from the plurality of burners using a second gas valve.

4. The system of claim 1, wherein:
the memory is operable to store a temperature map that maps temperatures to speeds of the air circulation fan; and
the microprocessor is configured to determine the second speed using the temperature difference and the temperature map.

5. The system of claim 1, wherein the microprocessor is configured to transition the heating unit from the first configuration to a second configuration when the temperature difference is greater than the temperature rise threshold, wherein transitioning the heating unit from the first configuration to the second configuration comprises switching from a first set of active burners in a first segment of a gas manifold to a second set of active burners in a second segment of the gas manifold, and wherein the second set of active burners has less active burners than the first set of active burners.

6. The system of claim 1, wherein the microprocessor is configured to transition the heating unit from the first configuration to a second configuration when the temperature difference is greater than the temperature rise threshold, wherein transitioning the heating unit from the first configuration to the second configuration comprises decreasing a pressure for a gas valve for the active burners.

7. A heating control device comprising:
input/output (I/O) ports configured to transmit and receive electrical signal;
a memory operable to store a plurality of temperature rise thresholds; and
a microprocessor operably coupled to the I/O ports and the memory, and configured to:
transmit a first electrical signal to operate an air circulation fan at a first speed and a heating unit in a first configuration with at least one active burner from a plurality of burners to achieve a first temperature rise, wherein less than all of the burners are active when the heating unit is in the first configuration;

obtain a return air temperature;

obtain a room air temperature;

determine a temperature difference between the return air temperature and the room air temperature;

compare the temperature difference to a temperature rise threshold; and transmit a second electrical signal to transition the air circulation fan from the first speed to a second speed to achieve a second temperature rise when the temperature difference is greater than the temperature rise threshold, wherein the second speed is greater than the first speed, and wherein the second temperature rise is less than the first temperature rise.

8. The device of claim 7, wherein operating the heating unit in the first configuration comprises:

activating the at least one active burner using a first segment of a gas manifold; and deactivating at least one burner using a second segment of the gas manifold, wherein gas communication between the first segment and the second segment is disallowed.

9. The device of claim 7, wherein operating the heating unit in the first configuration comprises:

activating the at least one active burner using a first gas valve; and deactivating at least one burner from the plurality of burners using a second gas valve.

10. The device of claim 7, wherein:

the memory is operable to store a temperature map that maps temperatures to speeds of the air circulation fan; and the microprocessor is configured to determine the second speed using the temperature difference and the temperature map.

11. The device of claim 7, wherein the microprocessor is configured to transition the heating unit from the first configuration to a second configuration when the temperature difference is greater than the temperature rise threshold, wherein transitioning the heating unit from the first configuration to the second configuration comprises switching from a first set of active burners in a first segment of a gas manifold to a second set of active burners in a second segment of the gas manifold, and wherein the second set of active burners has less active burners than the first set of active burners.

12. The device of claim 7, wherein the microprocessor is configured to transition the heating unit from the first configuration to a second configuration when the temperature difference is greater than the temperature rise threshold, wherein transitioning the heating unit from the first configuration to the second configuration comprises decreasing a pressure for a gas valve for the active burners.

13. The device of claim 7, wherein the microprocessor is configured to:

transition the heating unit from the first configuration to a second configuration when the temperature difference is greater than the temperature rise threshold, wherein transitioning the heating unit from the first configuration to the second configuration comprises switching from a first set of active burners in a first segment of a gas manifold to a second set of active burners in a second segment of the gas manifold, and wherein the second set of active burners has less active burners than the first set of active burners; and decrease a pressure for a gas valve for the second set of active burners.

14. A heating control method comprising:

operating, by a microprocessor, an air circulation fan at a first speed and a heating unit in a first configuration with at least one active burner from a plurality of burners to achieve a first temperature rise, wherein less than all of the burners are active when the heating unit is in the first configuration;

obtaining, at the microprocessor, a return air temperature;

obtaining, at the microprocessor, a room air temperature;

determining, by the microprocessor, a temperature difference between the return air temperature and the room air temperature;

comparing, by the microprocessor, the temperature difference to a temperature rise threshold; and transitioning, by the microprocessor, the air circulation fan from the first speed to a second speed to achieve a second temperature rise when the temperature difference is greater than the temperature rise threshold, wherein the second speed is greater than the first speed, and wherein the second temperature rise is less than the first temperature rise.

15. The method of claim 14, wherein operating the heating unit in the first configuration comprises:

activating the at least one active burner using a first segment of a gas manifold; and deactivating at least one burner using a second segment of the gas manifold, wherein gas communication between the first segment and the second segment is disallowed.

16. The method of claim 14, wherein operating the heating unit in the first configuration comprises:

activating the at least one active burner using a first gas valve; and deactivating at least one burner from the plurality of burners using a second gas valve.

17. The method of claim 14, further comprising determining, by the microprocessor, the second speed using the temperature difference and a temperature map that maps temperature to speeds of the air circulation fan.

18. The method of claim 14, further comprising transitioning, by the microprocessor, the heating unit from the first configuration to a second configuration when the temperature difference is greater than the temperature rise threshold, wherein transitioning the heating unit from the first configuration to the second configuration comprises switching from a first set of active burners in a first segment of a gas manifold to a second set of active burners in a second segment of the gas manifold, and wherein the second set of active burners has less active burners than the first set of active burners.

19. The method of claim 14, further comprising transitioning, by the microprocessor, the heating unit from the first configuration to a second configuration when the temperature difference is greater than the temperature rise threshold, wherein transitioning the heating unit from the first configuration to the second configuration comprises decreasing a pressure for a gas valve for the active burners.

20. The method of claim 14, further comprising:

transitioning, by the microprocessor, the heating unit from the first configuration to a second configuration when the temperature difference is greater than the temperature rise threshold, wherein transitioning the heating unit from the first configuration to the second configuration comprises switching from a first set of active burners in a first segment of a gas manifold to a second set of active burners in a second segment of the gas manifold, and wherein the second set of active burners has less active burners than the first set of active burners; and decreasing a pressure for a gas valve for the second set of active burners.

* * * * *